(12) United States Patent
Ito et al.

(10) Patent No.: US 6,924,067 B1
(45) Date of Patent: Aug. 2, 2005

(54) POLYMER ELECTROLYTE AND POLYMER LITHIUM BATTERY

(75) Inventors: Takahito Ito, Tsu (JP); Osamu Yamamoto, Ichinomiya (JP); Tatsuo Fujinami, Hamamatsu (JP)

(73) Assignees: Toyota Jidosha Kabushiki Kaisha, Toyota (JP); Genesis Research Institute, Inc., Nagoya (JP)

(*) Notice: Subject to any disclaimer, the term of this patent is extended or adjusted under 35 U.S.C. 154(b) by 0 days.

(21) Appl. No.: 10/409,065

(22) Filed: Apr. 9, 2003

(30) Foreign Application Priority Data

| Apr. 9, 2002 | (JP) | 2002-107020 |
|---|---|---|
| Apr. 9, 2002 | (JP) | 2002-107035 |
| Jan. 8, 2003 | (JP) | 2003-002423 |

(51) Int. Cl.[7] .............................................. H01M 6/14
(52) U.S. Cl. ....................... 429/307; 429/317; 429/320; 429/322
(58) Field of Search ................................ 429/317, 320, 429/322, 307

(56) References Cited

U.S. PATENT DOCUMENTS

| 5,686,138 A | * 11/1997 | Fujimoto et al. | 429/326 |
|---|---|---|---|
| 6,210,838 B1 | 4/2001 | Fujinami et al. | 429/304 |

FOREIGN PATENT DOCUMENTS

| JP | 63-193954 | 8/1988 |
|---|---|---|
| JP | 2-207454 | 8/1990 |
| JP | 05-314995 | 11/1993 |
| JP | 10-275521 | 10/1998 |
| JP | 11-54151 | 2/1999 |
| JP | 2000-030530 | 1/2000 |
| JP | 2001-55441 | 2/2001 |

OTHER PUBLICATIONS

Abstract of KR 2002019221, Mar. 12, 2002.*
Abstract of KR 2002025481, Apr. 4, 2002.*
Polymer electrolytes based on hyperbranched polymers. Journal of Power Sourdes (2001, 97–98, 637–640. Itoh et al.*
Blend–based polymer electrolytes of poly(ethylene oxide) and hyperbranched poly[bis(triethylene glycol) benzoate] with terminal acetyl groups. Solid State Ionics (2000), 134(3,4), 281–289. Wen et al.*
Characterization of composite electrolytes based on hyper-branched polymer. Journal of Power Sources (2000), 09(1), 20–26.Wen et al.*
Ionic conductivity of the hyperbranched polymer–lithium metal salt systems. Journal of Power Sources. (1999), 81–82, 824–829 Itoh et al.*

(Continued)

*Primary Examiner*—Hoa Van Le
(74) *Attorney, Agent, or Firm*—Finnegan, Henderson, Farabow, Garrett & Dunner, LLP

(57) ABSTRACT

A polymer electrolyte includes a substrate polymer, a branched polymer, and a lithium salt. The branched polymer has a main chain whose repeating unit is composed of an oligoethylene oxide chain and a connector molecule bonded to the oligoethylene oxide chain. The branched polymer can be a hyperbranched polymer. The polymer electrolyte can further include a composite oxide and/or a boroxine compound. The polymer electrolyte is good in terms of the ionic conductivity, and exhibits a high ionic conductivity especially at low temperatures. When the polymer electrolyte is used to make polymer lithium batteries, the resulting polymer lithium batteries shows improved charge-discharge cycle characteristics. In particular, it is possible to operate the polymer lithium batteries at low temperatures.

13 Claims, 13 Drawing Sheets

OTHER PUBLICATIONS

Thermal, electrochemical, and spectroscopic characterizations of hyperbranched polymer electrolyte.Journal of the Electrochemical Society (1999), 146(6), 2209–2215. Wang et al.*

Effect of branching in base polymer on ionnic conductivity in hyperbranched polymer electrolyte. Solid State Ionics. (2002), 150(3,4), 337–345. Itoh et al.*

Electrochemical and thermal properties of hyper-branched polymer electrolytes for batteries. Ionics (2002), 8(1&2), 44–52. Itoh et al.*

Abstract of JP2001332305, Nov. 2001.*

* cited by examiner

POLYMER ELECTROLYTE AND POLYMER LITHIUM BATTERY

BACKGROUND OF THE INVENTION

1. Field of the Invention

The present invention relates to a polymer electrolyte which is applicable to solid electrolytes of batteries. Moreover, it relates to a polymer lithium battery which uses the polymer electrolyte.

2. Description of the Related Art

Polymeric materials have been found in which electrolytes such as alkali metal salts are solved in high concentrations, and which exhibit high ionic conductivity as solids. They are referred to as polymer solid electrolytes or polymer electrolytes. The polymer solid electrolytes are lightweight, are full of formability, and form solid films. Accordingly, it is expected to apply the polymer solid electrolytes as novel solid electrolytes, which exhibit elasticity and flexibility, to energy fields and electronics fields.

As ionically conducting polymers having been studied so far, ionically conducting polymers have been known which have polyether, polyester, polyamine and polysulfide linear polymers as their basic structures. Since the ionically conducting polymers, which have these chemical structures, are multi-phase crystalline polymers, their ionic conductivity is likely to be affected by the phase changes so that they exhibit low ionic conductivity at room temperature. In order to solve the problem, a variety of proposals have been made as follows:

a) polymers including ether segments which exhibit relatively high ionic conductivity;

b) polymers cross-linked with polyethers;

c) polymer electrolyte-type ion conductors; and d) plastisized polymers.

However, when the polymers set forth in proposal a) above have low molecular weights, they are turned into liquid state. Even when the polymers have high molecular weights, they suffer from a problem in that their mechanical strength is insufficient. Although the polymers set forth in proposal b) exhibit high mechanical strength, their formability is so low that it is difficult to form them. In the polymer electrolyte-type ion conductors set forth in proposal c), cations are captured by the paired anion sites so strongly that they exhibit low ionic conductivity. In the plastisized polymers set forth in proposal d), since organic solvents are used, they suffer from safety problems.

In order to solve the problems, a variety of polymers have reported recently in the following patent publications, for example:

Japanese Unexamined Patent Publication (KOKAI) No. 63-193,954;

Japanese Unexamined Patent Publication (KOKAI) No. 2-207,454;

Japanese Unexamined Patent Publication (KOKAI) No. 5-314,995;

Japanese Unexamined Patent Publication (KOKAI) No. 10-275,521;

Japanese Unexamined Patent Publication (KOKAI) No. 11-54,151;

Japanese Unexamined Patent Publication (KOKAI) No. 2001-55,441.

Japanese Unexamined Patent Publication (KOKAI) No. 63-193,954 discloses an organic polymer. The organic polymer comprises a polyethylene oxide main chain, and branched polyethylene oxide in which side chains, made of ethylene oxide adducts, are introduced into the main chain byway of an ester bond. In addition, the organic polymer disclosed herein forms a composite with lithium ions, and makes a lithium ion conductive polymer electrolyte. Moreover, Japanese Unexamined Patent Publication (KOKAI) No. 2-207,454 discloses an all-solid lithium secondary battery. In the all-solid lithium secondary battery, an organic polymer is used in which side chains, made of oligoethylene oxide, are introduced into a main chain, made of polyphosphazene.

In the organic polymers, oligoethylene oxide is the side chains, and the side chains are bonded to the main chains. Accordingly, in ion conducting polymer solid electrolytes in which alkali metal salts are solved, it is difficult to maintain the mechanical properties unless the repeating units constituting the main chains exhibit sufficient mechanical strength. Moreover, in both of the organic polymers, since the main chains are made of soft polymers, they are insufficient in terms of the mechanical strength. Accordingly, they suffer from a problem regarding the formability.

Moreover, as means for enhancing the ionic conductivity of a polymer electrolyte, Japanese Unexamined Patent Publication (KOKAI) No. 5-314,995 discloses an electrolyte composite in which an insulative powder is dispersed in an amount of from 5 to 60% by volume in a solid polymer electrolyte in which $Li^+$ is a main charge carrier. In the patent publication, $Al_2O_3$, $SiO_2$, $Fe_2O_3$, $ZrO_2$, $CeO_2$, $BaTiO_3$, $PbTiO_3$ and $Pb(Zr, Ti)O_3$ are named as the insulative powder, and polyethylene oxide and polypropylene oxide are used as the solid polymer electrolyte.

In addition, Japanese Unexamined Patent Publication (KOKAI) No. 10-275,521 discloses a polymer electrolyte and a process for producing the same. The polymer electrolyte is produced in the following manner. A polymer solution containing a composite oxide is turned into a film. After evaporating the solvent from the film, the film is impregnated with an electrolyte liquid. After the impregnation, the resulting polymer electrolyte exhibits a swelling degree of 2.2 or more.

In order to use the solid polymer electrolytes in polymer batteries, it is necessary to enhance the conductivity of the solid polymer electrolytes. However, depending on the types of electrolyte salts used for enhancing the conductivity, the electrolyte salts react with aluminum foils, which are used for current collectors of electrodes, to corrode aluminum foils or to form films with high resistance. Consequently, there might arise cases where it is hard for the resulting batteries to operate at room temperature.

On the other hand, in Japanese Unexamined Patent Publication (KOKAI) No. 11-54,151, the applicants of the present invention disclosed to improve the ionic conductivity by adding boroxine compounds into polymer electrolytes. When complexes of ether polymers and alkali metal salts are used as polymer electrolytes, not only cations but also anions move very well usually. By adding boroxine compounds into polymer electrolytes, the boroxine rings within the boroxine compounds make anion receptacles (or anion traps), and cations are conducted through polymer matrix so that the single ionic conduction occurs in which only the cations are transferred. Moreover, since the boroxine ring do not hinder the single ionic conduction of the cations, the cationic conductivity is enhanced. As a result, it is possible to improve the ionic conductivity at room temperature, which has been considered difficult conventionally.

Moreover, Japanese Unexamined Patent Publication (KOKAI) No. 2001-55,441 discloses an ionic conductor. The ionic conductor comprises an electrolyte salt for ionic conduction, an ionically conducting molecule including an ionic conduction molecular chain for sustaining ionic conduction, and a boroxine ring bonded to the ionic conduction molecular chain and trapping anions resulting from the electrolyte salt for ionic conduction, and a structural member for dispersion and immobilization of the ionically conducting molecule and the electrolyte salt for ionic conduction.

However, it has been required recently to further upgrade the various battery characteristics of the polymer lithium batteries which use conductive polymers.

SUMMARY OF THE INVENTION

The present invention has been developed in view of the aforementioned circumstances. It is therefore an object of the present invention to provide a polymer electrolyte whose ionic conductivity is improved. It is a further object of the present invention to provide a polymer electrolyte whose ionic conductivity is upgraded in a low temperature region. It is a furthermore object of the present invention to provide a polymer electrolyte which can further enhance the various battery characteristics of polymer lithium batteries. It is a moreover object of the present invention to provide a polymer lithium battery in which the polymer electrolyte is inhibited from reacting with metallic foils, constituting the current collector of the polymer lithium battery, such as aluminum foils. It is a still further object of the present invention to provide a polymer lithium battery whose various battery characteristics are improved.

A polymer electrolyte according to the present invention comprises: a substrate polymer; a branched polymer having a main chain whose repeating unit is composed of an oligoethylene oxide chain and a connector molecule bonded to the oligoethylene oxide chain; and a lithium salt.

When the substrate polymer and the branched polymer, which includes the oligoethylene oxide chain, are used in combination, the present polymer electrolyte is improved in terms of the ionic conductivity. Moreover, since the lithium salt exists in the polymer electrolyte, it is possible to produce high ionic conductivity in the polymer composite of the substrate polymer and branched polymer. In particular, it is possible to enhance the ionic conductivity of the present polymer electrolyte in a low temperature region. Note that the branched polymer can preferably be a hyperbranched polymer described later.

The present polymer electrolyte can preferably further comprise a composite oxide.

When the composite oxide is further added to the present polymer electrolyte, the mobility of the lithium ions resulting from the lithium salt is improved therein. Accordingly, it is possible to upgrade the electrolyte characteristics and mechanical characteristics of the present polymer electrolyte. In particular, it is possible to further enhance the ionic conductivity of the present polymer electrolyte in a low temperature region.

The lithium salt can preferably be at least one member selected from the group consisting of $Li(CF_3SO_2)_2N$ and $Li(C_2F_5SO_2)_2N$.

The composite oxide can preferably be at least one member selected from the group consisting of $BaTiO_3$, $\alpha\text{-}LiAlO_2$ and $\gamma\text{-}LiAlO_2$.

The substrate polymer can preferably be at least one member selected from the group consisting of polyethylene oxide, polypropylene oxide and ethylene oxide-propylene oxide copolymers.

The connector molecule can preferably be dihydroxy benzoate.

The polymer electrolyte can preferably further comprise a boroxine compound.

A polymer lithium battery comprises: a positive electrode; a polymer electrolyte comprising: a substrate polymer; a branched polymer having a main chain whose repeating unit is composed of an oligoethylene oxide chain and a connector molecule bonded to the oligoethylene oxide chain; and a composite lithium salt; and a negative electrode.

The polymer electrolyte can preferably further comprise a composite oxide.

The composite lithium salt can preferably be at least one member selected from the group consisting of $Li(CF_3SO_2)_2N$—$LiPF_6$ composite salts and $Li(C_2F_5SO_2)_2N$—$LiPF_6$ composite salts.

The composite lithium salt can preferably include $LiPF_6$ in an amount of from 5 to 20% by weight with respect to the entire composite lithium salt taken as 100% by weight.

The polymer electrolyte can preferably further comprise a boroxine compound, and said positive electrode comprises the polymer electrolyte with the boroxine compound added as the binder.

In the present polymer electrolyte, the substrate polymer and the branched polymer including the oligoethylene oxide chains are used in combination. Accordingly, the present polymer electrolyte is improved in terms of the ionic conductivity. Moreover, due to the presence of the lithium salt, the present polymer electrolyte is upgraded in terms of the ionic conductivity in a low temperature region. In addition, when the composite oxide is added to the present polymer electrolyte, the mobility of the ions is enhanced. Consequently, the present polymer electrolyte can be improved in terms of the electrolytic characteristics and mechanical characteristics, especially in terms of the ionic conductivity in a low temperature region.

Further, when $LiPF_6$ is added to the lithium salt to make the composite lithium salt in the present polymer lithium battery which uses the present polymer electrolyte, it is possible to inhibit high-resistant films from forming. The high-resistant films are formed by the reaction between the current collector of the positive electrode (e.g., aluminum) and the lithium salt. As a result, it is possible to produce polymer lithium batteries which are stable from high temperatures to low temperatures.

Furthermore, when the boroxine compound is further added to the present polymer electrolyte, it is possible to effect an advantage of improving the ionic transport number of the lithium ion ($Li^+$) in the present polymer electrolyte. In addition thereto, when the present polymer electrolyte with the boroxine compound added is used as a binder for positive electrode compositions of polymer lithium batteries, it is possible to upgrade the battery characteristics of the resulting polymer lithium batteries, for example, to enlarge the capacity of the positive electrodes and to enhance the cyclic characteristic. At the same time, it is possible to operate the resultant polymer lithium batteries at low temperatures.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
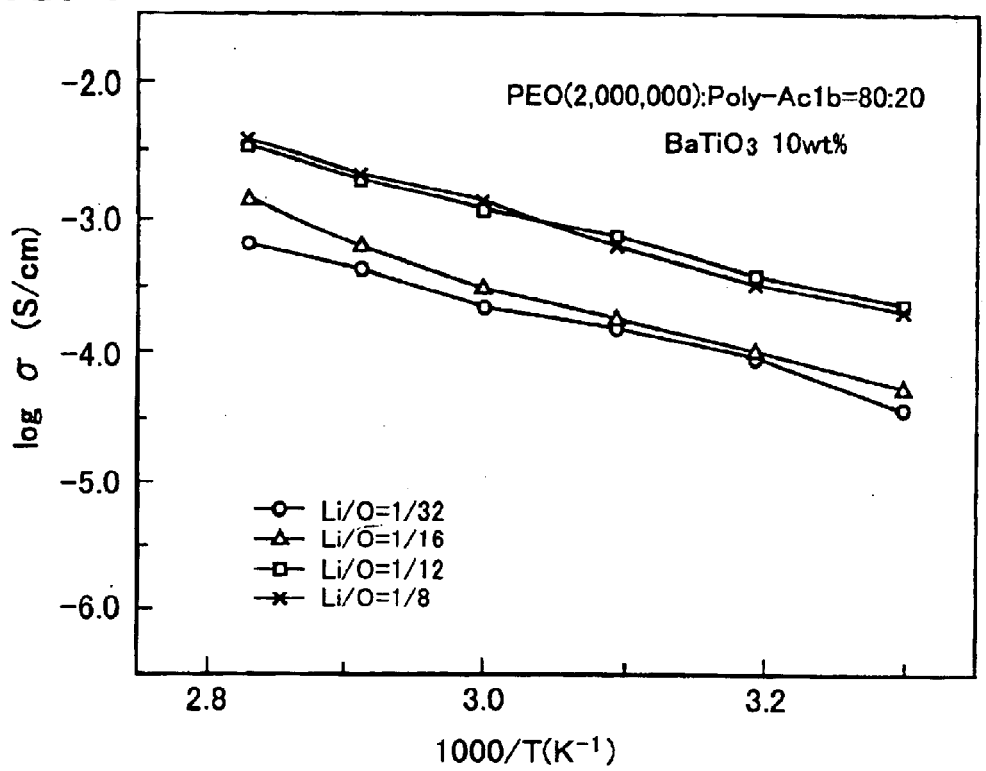
FIG. 1 is a graph for illustrating the temperature dependency of the ionic conductivity which was exhibited by a polymer electrolyte film according to Example No. 1.

Having generally described the present invention, a further understanding can be obtained by reference to the specific preferred embodiments which are provided herein for the purpose of illustration only and not intended to limit the scope of the appended claims.

The present polymer electrolyte comprises a substrate polymer, a branched polymer and a lithium salt. The branched polymer has a main chain whose repeating unit is composed of an oligoethylene oxide chain and a connector molecule bonded to the oligoethylene oxide chain. Moreover, the branched polymer can preferably be a hyperbranched polymer described later. In addition, the present polymer electrolyte can preferably further comprise a composite oxide. In another aspect of the present invention, the present polymer electrolyte comprises a polymer composite, and a lithium salt. The polymer composite is composed of a substrate polymer and a branched polymer. The branched polymer comprises repeating units composed of a hub molecule and an oligoethylene oxide chain. The oligoethylene oxide chain is bonded to the hub molecule, and is branched by way of the hub molecule in two directions at least. The polymer composite and the lithium salt are mixed in such a proportion that the number of the Li atoms with respect to the O atoms included in the ether bonds of the substrate polymer and the branched polymer of the polymer composite falls in a range of from 1/8 to 1/32 (i.e., Li/O= 1/8–1/32). The present polymer electrolyte can preferably further comprise a composite oxide in an amount of from 1 to 20% by weight, furthermore preferably from 5 to 15% by weight, with respect to the entire present polymer electrolyte taken as 100% by weight. The present polymer electrolyte can preferably further comprise a boroxine compound in an amount of from 1 to 20% by weight, furthermore preferably from 3 to 10% by weight, moreover preferably from 4 to 6% by weight, with respect to the entire present polymer electrolyte taken as 100% by weight.

As the substrate polymer, it is possible to use polyalkylene oxide, such as polyethylene oxide, polypropylene oxide, copolymers of ethylene oxide and propylene oxide.

In the present polymer electrolyte, the substrate polymer and the branched polymer are used in combination. Accordingly, it is possible to improve the ionic conductivity of the present polymer electrolyte. At the same time, it is possible to upgrade the electrolyte characteristics and mechanical characteristics of the present polymer electrolyte.

As the branched polymer used along with the substrate polymer, it is possible to use a branched polymer, which is composed of oligoethylene oxide chains bonded to connector molecules and branched by way of the connector molecules. The oligoethylene oxide chains can coordinate the cations of electrolytes, for example, lithium ions, with a high density, and can transport them. It is believed that the oligoethylene chains can enhance the ionic conductivity of the substrate polymer, for instance, polyalkylene oxide chains thereof. As a result, when the substrate polymer and the branched polymer are compounded, their synergistic effect can enhance the ionic conductivity of the present polymer electrolyte.

The substrate polymer can preferably have a molecular weight falling in range of from 100,000 to 5,000,000 approximately. When the molecular weight of the substrate polymer is too small, it is not preferable because it is difficult to form the mixture of the substrate polymer and the branched polymer into films. Moreover, the mixture of the substrate polymer and the branched polymer is usually formed into films from solutions. Accordingly, when the molecular weight of the substrate polymer is too large, it is not preferable because the substrate polymer is less soluble in solvents. In addition, it is not preferred that the substrate polymer is cross-linked to be less soluble in solvents.

The branched polymer is not cross-linked, but is composed of oligoethylene oxide side chains which are branched by way of the connector molecules. Accordingly, the ethylene oxide groups of the branched oligoethylene oxide side chains are amorphous. Consequently, the branched polymer exhibits ionic conductivity. Thus, when the branched polymer and the ion-conductive substrate polymer form polymer composites, their synergic effect can enhance the ionic conductivity of the resulting polymer composites.

Specifically, the branched polymer can preferably be a hyperbranched polymer. The hyperbranched polymer can have a main chain whose repeating unit is composed of an oligoethylene oxide chain and a connector molecule bonded to the oligoethylene oxide chain and having three functional groups at least, and a plurality of side chains whose repeating unit is composed of an oligoethylene oxide chain branched by way of the connector molecules of the main chain. For example, the hyperbranched polymer can preferably be composed of a repeating unit which has 2 branched oligoethylene oxide side chains at least. Moreover, the repeating unit of the hyperbranched polymer can preferably have from 1 to 20, further preferably from 2 to 10, furthermore preferably from 3 to 6 branched oligoethylene oxide side chains. A general formula of the hyperbranched polymer can be expressed by chemical formula (1) below.

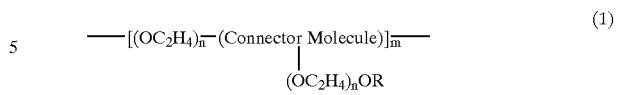

wherein R is —H, alkyl groups, such as —CH$_3$, whose number of carbon atoms is 3 or less, or acyl groups, such as —COCH$_3$, whose number of carbon, atoms is 3 or less; n and n' specify the degrees of polymerization of oligoethylene oxide and are integers falling in a range of from 1 to 20; and m specifies the number of repeating units and is an arbitrary integer.

Note that when the end group of the branched side chains is —OH, metallic ions can be captured by —OH group so that metallic ions are inhibited from migration. Accordingly, the end group can preferably be other than —OH group, and can further preferably be esterified, for example.

In the repeating unit of the hyperbranched polymer, the connector molecule can be bonded to an end group of the main oligoethylene oxide chain by an ether bond, can be bonded to an end group of a branched oligoethylene oxide chain by an ether bond, and can be bonded to an end group of the main oligoethylene oxide chain or the branched oligoethylene oxide side chain of the neighboring repeating unit by an ester bond. Thus, the repeating units of the hyperbranched polymer are formed.

As the connector molecule, it is possible to use aromatic carboxylic acids having a plurality of hydroxy groups, and esters thereof. For example, when dihydroxy aromatic carboxylate is used as the connector molecule, each of the hydroxy groups is bonded to an end group of an oligoethylene oxide chain by an ether bond, and the carboxylic group is bonded to an end group of the main oligoethylene oxide or the branched oligoether oxide side chains of the neighboring repeating unit by an ester bond. Thus, the repeating units are branched by way of the connector molecules to polymerize. In this instance, the positions of the hydroxy groups on the benzene ring of the dihydroxy aromatic carboxylate acid can be ortho-positions, meta-positions and para-positions with respect to the carboxylic acid group as far as they can form an ether bond with the oligoethylene oxide chains. For instance, it is possible to use 3, 5-dihydroxy benzoic acid and 3, 4-dihydroxy benzoic acid as the connector molecule. In particular, 3, 5-dihydroxy benzoic acid in which the hydroxy groups are bonded to the symmetric positions with respect to the carboxylic acid group can be a preferable option in order to form a branched polymer.

Moreover, a part of the oligoethylene oxide chains which are bonded to the connector molecule can form a second branched side chain which is composed of an oligoethylene oxide chain as shown in chemical formula (2) below. An end group of the second side oligoethylene oxide chain can be bonded to an organic group selected from the group consisting of hydrogen, and alkyl groups and acyl groups whose number of carbon atoms is 3 or less. The alkyl group can be a methyl group, an ethyl group and a propyl group. The acyl group can be an acetyl group and a propionyl group. In addition, when the end group of the second oligoethylene oxide side chain is an —OH group, the second oligoethylene oxide side chain is likely to form bonds with salts. Accordingly, when lithium salts are used as the electrolyte, it is desirable that the end group of the second oligoethylene oxide side chain can be bonded to an organic group selected from the group consisting of alkyl groups and acyl groups. These organic groups can desirably be such bulky groups that they do not interfere with the coordination of ions.

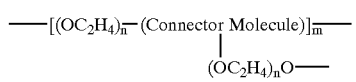

$$—[(OC_2H_4)_{\overline{n}}—(\text{Connector Molecule})]_{\overline{m}}— \atop | \atop (OC_2H_4)_nO—\qquad (2)$$

The hyperbranched polymer can be a hyperbranched polymer in which the repeating units coexist randomly, in repeating units which a plurality of the second oligoethylene oxide side chains are branched by way of the connector molecule to form the branched side chains as shown in chemical formula (2). Since the second oligoethylene oxide side chains form branched side chains, they are provided with high degree of freedom in the hyperbranched polymer molecule. Accordingly, the hyperbranched polymer can be provided with the affinity to electrolyte ions and easiness to transfer them. Consequently, it is possible to further enhance the ionic conductivity of the present polymer electrolyte.

As described above, the hyperbranched polymer is a branched polymer in which the oligoethylene oxide chains are branched in two directions by way of the connector molecules. Accordingly, contrary to cross-linked polymers, it is possible to enhance the mechanical characteristics of the polymer composite made from the substrate polymer and the hyperbranched polymer while retaining the formability. Moreover, the hyperbranched polymer is a branched polymer, and is a non-crystalline or amorphous polymer. Consequently, it is possible to remove the adverse effect resulting from the phase change of polymers.

The hyperbranched polymer can be synthesized, for example, by adding ethylene oxide to the phenolic hydroxy groups of dihydroxy benzoate, or by esterifying halogenated oligoethylene oxide, a halide of oligoethylene oxide with one of the opposite end groups protected, with phenolic hydroxy groups. Moreover, it can be synthesized by a condensation polymerization of monomeric esters of dioligoethylene dihydroxy benzoate by heating in the presence of catalysts (e.g., tin catalysts).

The degree of polymerization of the oligoethylene oxide chains making the repeating unit of the hyperbranched polymer can preferably fall in a range from 1 to 20. When the polymerization degree of the oligoethylene oxide chains is too low, the resulting hyperbranched polymers exhibits insufficient ionic conductive performance. On the contrary, when it is too high, the crystallization is likely to occur in the oligoethylene oxide chains, crystallization which lowers the ionic conductivity of the resulting hyperbranched polymers. As the raw material of the oligoethylene oxide chains, it is possible to use the following: diethylene glycol; triethylene glycol; oligoethylene glycol, triethylene glycol monochlorohydrin ($HOCH_2CH_2OCH_2CH_2OCH_2CH_2Cl$); diethylene glycol monochlorohydrin ($HOCH_2CH_2OCH_2CH_2Cl$); oligoethylene glycol monochlorohydrin ($HOCH_2CH_2(OCH_2CH_2)_{3-16}OCH_2CH_2Cl$); triethylene glycol monobromohydrin ($HOCH_2CH_2OCH_2CH_2OCH_2CH_2Br$); diethylene glycol monobromohydrin ($HOCH_2CH_2OCH_2CH_2Br$); and oligoethylene glycol monobromohydrin ($HOCH_2CH_2(OCH_2CH_2)_{3-16}OCH_2CH_2Br$).

In view of the ionic conductivity and mechanical characteristics of the present polymer electrolyte, the compounding proportion of the hyperbranched polymer can preferably fall in a range of from 5 to 40% by weight, further preferably from 5 to 30% by weight, furthermore preferably from 5 to 20% by weight, with respect to the entire polymer composite of the substrate polymer and the hyperbranched polymer taken as 100% by weight.

As described above, the hyperbranched polymer can preferably be a hyperbranched polymer which comprises 3,5-dihydroxy benzoic acid (i.e., the connector molecule), and first and second oligoethylene oxide chains bonded to the hydroxy groups of the 3,5-dihydroxy benzoic acid by an ether bond at one of the end groups and bonded to the carboxylic group of the neighboring 3.5-dihydroxy benzoate by an ester bond at the other one of the end groups. As for such a hyperbranched polymer, it is possible to name polybistriethyelene glycol benzoate.

The present polymer electrolyte can preferably further comprise at least a composite oxide selected from the group consisting of $BaTiO_3$, $\alpha$-$LiAlO_2$ and $\gamma$-$LiAlO_2$. When the composite oxide is added, the present polymer electrolyte is improved in terms of the ionic conductivity at around room temperature. As a result, it is possible to operate polymer lithium batteries using the present polymer electrolyte at room temperature. The composite oxide can preferably be added in an amount of from 1 to 20% by weight, further preferably from 5 to 15% by weight, furthermore preferably from 5 to 10% by weight, with respect to the entire present polymer electrolyte taken as 100% by weight. Moreover, in view of the dispersibility in the substrate polymer, the composite oxide can preferably have particle diameters falling in a range of from 10 nm to 1,000 nm.

As the lithium salt included in the present polymer electrolyte, it is possible to use at least one member selected from the group consisting of $Li(CF_3SO_2)_2N$ and $Li(C_2F_5SO_2)_2N$.

When the substrate polymer is mixed with the hyperbranched polymer, and the resulting polymer composite is further mixed with the lithium salt, the thus produced present polymer electrolyte is improved in terms of the ionic conductivity. In particular, it is possible to upgrade the ionic conductivity of the present polymer electrolyte in a low temperature region.

Moreover, when the composite oxide is further added to the composite of the substrate polymer, the hyperbranched polymer and the lithium salt to produce the present polymer electrolyte, it is possible to enhance the electrical characteristics and mechanical characteristics of the present polymer electrolyte because the mobility of the lithium ions is improved by the addition of the composite oxide. In addition, it is possible to further upgrade the ionic conductivity of the present polymer electrolyte in a low temperature region.

The compounding amount of the lithium salt can be determined by a ratio of the number of the lithium atoms included in the lithium salt with respect to the number of the oxygen atoms included in the ether bonds of the substrate polymer and the hyperbranched polymer. In view of the ionic conductivity of the present polymer electrolyte, it is preferable to compound the lithium salt so that the ratio Li/O by the number of atoms can fall in a range of from 1/8 to 1/32, further preferably from 1/8 to 1/20, further more preferably from 1/8 to 1/12, by the number of atoms (i.e., Li/O=1/8–1/32, 1/8–1/20 or 1/8–1/12 by the number of atoms).

The present polymer electrolyte can be produced in the following manner. The substrate polymer, the hyperbranched polymer and the lithium salt are mixed in a solvent, for example, acetonitrile, to disperse therein. Alternatively, the composite oxide can be further added to the mixture. Then, the mixture can be turned into films by a wet method, such as casting. Depending on specific cases, a nonaqueous solvent, for instance, ring carbonates such as ethylene carbonate, can be further added to the mixture, and the mixture can be turned into films by casting.

Moreover, the present polymer electrolyte can preferably further comprise a boroxine compound. The boroxine compound is a compound which comprises a boroxine ring expressed by chemical formula (3) below. It is possible to use boroxine compounds in which an ionic conduction molecule providing an ion conducting pathway is bonded to the boroxine ring. When the boroxine compound is added to the present polymer electrolyte, the resulting polymer electrolyte is provided with an anion capturing action which derives from the boroxine ring, and a cation conduction action which derives from the ionic conduction molecule. Accordingly, it is possible to improve the ionic conductive characteristics of the present polymer electrolyte. In addition, when the present polymer electrolyte with the boroxine compound added is used as a binder for a positive electrode of the present polymer lithium battery described later, in addition to the advantages, it is possible to upgrade the battery characteristics of the present polymer lithium battery, such as the positive electrode capacity and cyclic characteristic.

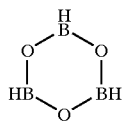
(3)

As for the boroxine compound, it is preferable to select boroxine compounds having an ether chain. As for the ether chain, it is possible to select an ether chain expressed by chemical formula (4) below. As for the boroxine compound, it is preferable to use a polymer expressed by chemical formula (5) below or a polymer expressed by chemical formula (6) below. Note that, from the viewpoint of the viscosity, the present polymer electrolyte can be more satisfactory when the mixtures of the polymers expressed by chemical formulae (5) and (6) are used. Moreover, it is possible to use trialkoxy boroxine expressed by chemical formula (7) below.

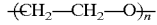
(4)

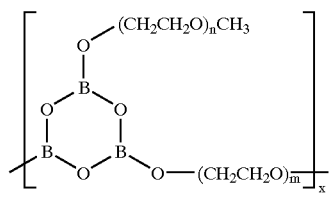
(5)

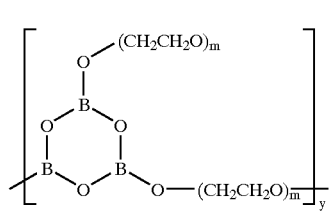
(6)

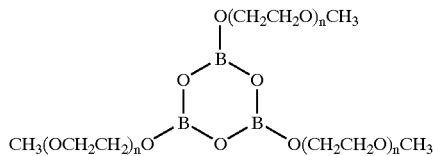
(7)

The boroxine compound can preferably be added to the present polymer electrolyte so that the ratio of the number of the boroxine rings with respect to the number the cations, i.e., the lithium ions, resulting from the lithium salt of the present polymer electrolyte, can preferably fall in a range of from 1 to 20, further preferably from 1 to 10, furthermore preferably from 1 to 5, with respect a lithium ion. In particular, the ratio of the number of the boroxine rings with respect to the number the lithium ions can desirably fall around 2:1.

It is possible to make the present lithium polymer battery by using the above-described present polymer electrolyte. In view of the ionic conductivity, it is preferable to use, for example, $Li(CF_3SO_2)_2N$ and $Li(C_2F_5SO_2)_2N$, for the lithium salt included in the present polymer electrolyte. However, these lithium salts are inclined to react with aluminum foils, which are used as a current collector for positive electrodes of batteries, to form highly resistant films. In order to inhibit highly resistant films from forming, for instance, LiPF6 can be added to $Li(CF_3SO_2)_2N$ and $Li(C_2F_5SO_2)_2N$. When $LiPF_6$ is added to the lithium salts, the lithium salts are turned into composite salts so that it is possible to suppress the unfavorable reaction with aluminum.

As the composite lithium salt included in the present polymer lithium battery, it is possible to use at least one composite lithium salt selected from the group consisting of $Li(CF_3SO_2)_2N$—$LiPF_6$ composite salts and $Li(C_2F_5SO_2)_2N$—$LiPF_6$ composite salts. When LiPF6 is added to the lithium salts to composite, it is possible to avoid forming highly resistant films in a high temperature region.

The addition of the $LiPF_6$ forming a part of the lithium composite salts can preferably fall in a range of from 5 to 20% by weight, further preferably from 5 to 15% by weight, furthermore preferably from 8 to 12% by weight, with respect to the entire composite lithium salts, such as the $Li(CF_3SO_2)_2N$—$LiPF_6$ and $Li(C_2F_5SO_2)_2N$—$LiPF_6$, taken as 100% by weight. When the $LiPF_6$ addition is less than 5% by weight, the advantage resulting from the addition is not appreciable. When the addition exceeds 20% by weight, it is not preferable because the ionic conductivity of the resulting polymer lithium batteries degrades.

The content of the composite lithium salt can be determined by a ratio of the number of the lithium ions included in the lithium salt with respect to the number of the oxygen atoms included in the ether bonds of the substrate polymer and the hyperbranched polymer. In order to upgrade the ionic conductivity of the present lithium polymer battery, it is preferable to add the composite lithium salt so that the ratio Li/O falls in a range of from 1/8 to 1/32 by the number of atoms (i.e., Li/O=1/8–1/32 by the number of atoms).

Regarding the structure of the present polymer, such as the positive electrode capacity and cyclic characteristic, battery in which the present polymer electrolyte is used, it is not limited in particular. However, the present polymer lithium battery can usually comprise a positive electrode, a negative electrode and the present polymer electrolyte, and can be made into laminated batteries, cylinder-shaped batteries and prismatic batteries. Moreover, as the electrodes combined with the present polymer electrolyte, it is possible to use electrodes which are appropriately selected from those used in known lithium secondary batteries.

For example, it is possible to use a positive electrode formed in the following manner. As the positive electrode active material, at least one member is selected from the group consisting of $LiMn_2O_4$, $LiNiO_2$ and $LiCoO_2$. The selected oxide of the transition metal is applied to an aluminum foil, a current collector, together with the present polymer electrolyte serving as the binder, thereby preparing a positive electrode.

The negative electrode comprises a negative electrode active material. The negative electrode active material can be pure metallic lithium, lithium alloys, carbonaceous substances such as graphite, oxide, and nitride. When the negative electrode active material is used in a powdery form, it is possible to form a negative electrode by applying the negative electrode active material together with a binder to a copper foil, a current collector.

As for the electrolyte, the above-described present polymer electrolyte can be used as it is. Moreover, it is possible to impregnate the present polymer electrolyte with nonaqueous solvents to use. The nonaqueous solvent can be carbonates such as ethylene carbonate, propylene carbonate, diethyl carbonate, dimethyl carbonate and methyl ethyl carbonate.

Moreover, when the present polymer electrolyte is used as a binder for the positive electrode of the present polymer lithium battery, it is preferable to further add a boroxine compound to the present polymer electrolyte. As for the boroxine compound added herein, it is possible to use the same boroxine compounds as those exemplified in the above-described present polymer electrolyte.

When the present polymer electrolyte with the boroxine compound added is used as the binder for the positive electrode of the present polymer lithium battery, the resulting positive electrode is provided with an anion capturing action which derives from the boroxine ring, and a cation conduction action which derives from the ionic conduction molecule. In addition to the advantages, it is possible to produce advantages that the positive electrode capacity of the present polymer lithium battery is enlarged and the cyclic characteristic is upgraded. It has not been cleared yet why the advantages are produced. Presumably, however, it is believed that the resistance of the positive electrode as well as the interface resistance between the positive electrode and the present polymer electrolyte are reduced. In order to more satisfactorily effect the advantages of enlarging the positive electrode capacity and upgrading the cyclic characteristic, the boroxine compound can preferably be added in an amount of from 3 to 10 parts by weight, further preferably from 3 to 7 parts by weight, furthermore preferably from 4 to 6 parts by weight, with respect to the composition of the positive electrode taken as 100 parts by weight.

The present polymer lithium battery in which the present polymer electrolyte is used is good in terms of the cyclic characteristics in a high temperature region as well as in a low temperature region. Moreover, when the present polymer electrolyte with the boroxine compound further added is used as the binder for the positive electrode of the present polymer lithium battery, the ionic conductivity of the present polymer lithium battery is improved, the positive electrode capacity is enlarged, and the cyclic characteristic is further upgraded.

Hereinafter, the present invention will be described in detail with reference to specific embodiments.

EXAMPLE NO. 1

As the substrate polymer, polyethylene oxide (hereinafter referred to as "PEO") whose molecular weight was $200 \times 10^4$ was used. As the hyperbranched polymer, acetylated poly [bis(triethylene glycohol) benzoate] (hereinafter referred to as "poly-Aclb") which is expressed by chemical formula (8) below was used. The poly-Aclb was compounded at three levels, i.e., in an amount of 10% by weight, 20% by weight and 30% by weight, with respect to the polymer composite of the PEO and poly-Aclb taken as 100% by weight, respectively. Moreover, as the composite oxide, $BaTiO_3$ was compounded in an amount of 10% by weight with respect to the resulting polymer electrolyte films taken as 100% by weight. In addition, as the lithium salt, $Li(CF_3SO_2)_2N$ was used, and was compounded in such amounts that the ratio of the number of Li atoms with respect to the number of the oxygen atoms involved in the ether bonds of the PEO and poly-Aclb was 1/8, 1/12, 1/16 and 1/32. The resultant mixtures were solved in acetonitrile, a solvent, and were subjected to a casting method to prepare polymer electrolyte films.

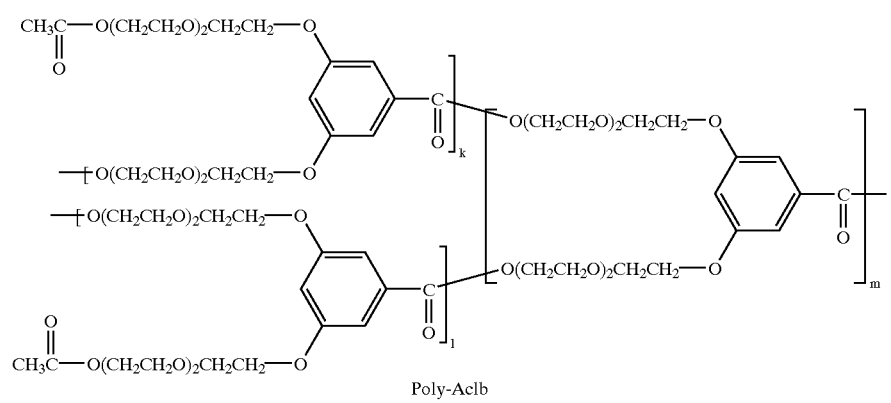

Poly-Aclb

Casting Method

The poly-Aclb and PEO which had been weighed in advance were mixed with the predetermined weight ratios. The resulting mixtures were solved in acetonitrile in a glove box in argon. With respect to the mixtures, $BaTiO_3$ was added in an amount of 10% by weight with respect to the resulting polymer electrolyte films taken as 100% by weight, and Li(CF$_3$SO$_2$)$_2$N was added in such amounts that the ratios of the number of Li atoms with respect to the number of the oxygen atoms were established as described above, thereby preparing uniform mixture solutions. The resultant mixture solutions were cast on a Teflon (trade name) sheet by a casting method. After leaving the cast mixture solutions in a glove box for 1 hour, they were vacuum dried in a drying furnace whose temperature was controlled at 40° C. for 4 hours, and were further dried under reduced pressure at 60° C. for 20 hours. Thus, polymer electrolyte films were prepared.

Assessment on Ionic Conductivity

The respective polymer electrolyte films were held between a ring made from fluorocarbon resin and an electrode made from stainless steel in order to keep the thickness constant during the measurement of the resistance. The resulting assemblies were connected to a complex AC impedance meter with cables to measure the resistance. The measurement was carried out from 20 to 80° C. at intervals of 10° C. From the thus measured resistances, the ionic conductivities were found at 30° C. and 80° C.

The ionic conductivity σ (S/cm) is defined as follows:

$$\sigma = C/R \quad (C = I/S)$$

wherein I is the thickness of the samples, S is the areas thereof and R is the resistance thereof. Note that the polymer electrolyte films were prepared so that the values I and S were 0.04 cm and 0.785 cm$^2$, respectively. Accordingly, in all of the polymer electrolyte films, the value C was always 0.051 approximately. The resistance R was determined by carrying out the complex AC impedance measurement as described above. When the measurement method is used, it is possible to clarify the behavior of bulk, grain boundary or electrode by analyzing the impedance variation and phase variation which correspond to the frequency variation.

Regarding the resultant polymer electrolyte films, the ionic conductivity was determined in a temperature range of from 30 to 80° C. in the above-described manner. In FIG. 1, the graph illustrates the temperature dependency of the ionic conductivities exhibited by the polymer electrolyte films in which the hyperbranched polymer was compounded with the substrate polymer in such a ratio that PEO/poly-Aclb=80/20 by weight and the addition of the lithium salt was varied as described above. In FIG. 1, the vertical axis specifies the logarithm of the ionic conductivity, and the horizontal axis specifies the inverse of the temperature multiplied by a factor of 1,000.

As illustrated in FIG. 1, the ionic conductivity increased when the concentration of the lithium ions, or the addition of the lithium salt, enlarged. The ionic conductivity reached the maximum value when the Li/O ratio was 1/12 by the number of atoms, and showed a lowering tendency when the Li/O ratio was 1/8 by the number of atoms.

Concerning the polymer electrolyte films in which the poly-Aclb was compounded in an amount of 10% by weight and 30% by weight with respect to the polymer composite of the PEO and poly-Aclb taken as 100% by weight, the ionic conductivity was assessed similarly. Although the results are not illustrated in the drawing, the ionic conductivity inclined likewise to increase as the concentration of the lithium ions, or the addition of the lithium salt, enlarged.

Figure 2:
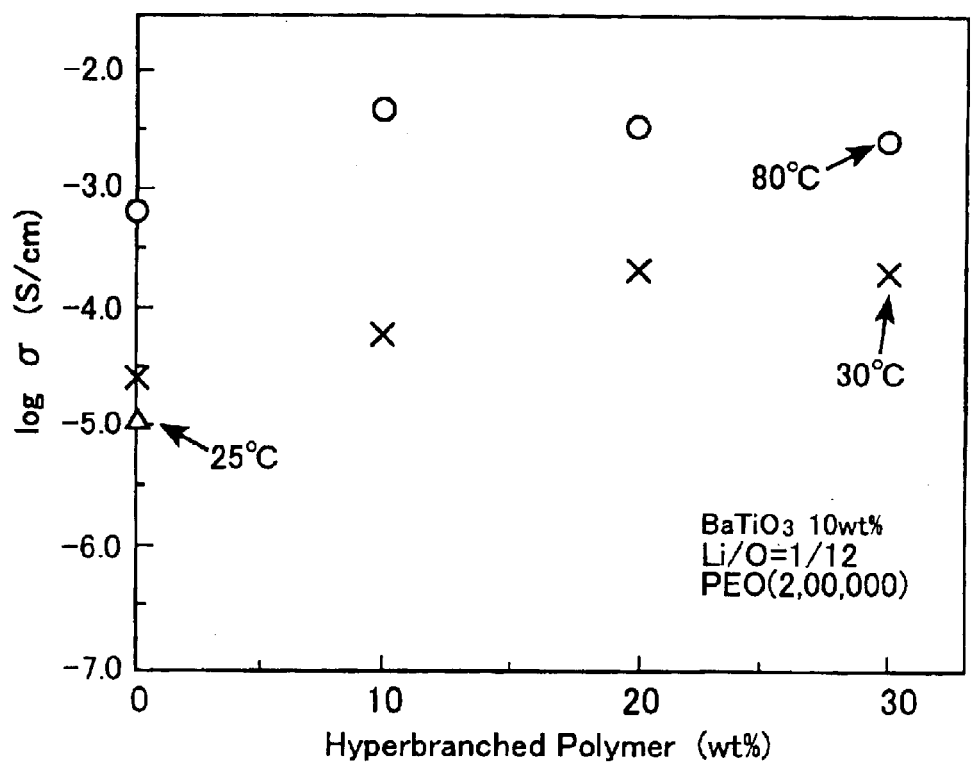
FIG. 2 is a graph for illustrating the dependency of the ionic conductivity with the addition of a hyperbranched polymer, dependency which was exhibited by the polymer electrolyte film according to Example No. 1.

FIG. 2 is a graph for illustrating the variation of the ionic conductivity accompanied by the enlargement of the poly-Aclb (i.e., hyperbranched polymer) content in the polymer electrolyte films in which the Li/O ratio was fixed at 1/12 by the number of atoms. In FIG. 2, the horizontal axis specifies the content of the poly-Aclb (e.g., 0% by weight, 10% by weight, 20% by weight and 30% by weight with respect to the polymer composite of the PEO and poly-Aclb taken as 100% by weight), and the vertical axis specifies the logarithm of the ionic conductivity. Note that the measurement of the ionic conductivity was carried out at a temperature of 30° C. marked with X and 80° C. marked with ○. Moreover, the data marked with Δ was exhibited by the polymer electrolyte film free from the poly-Aclb addition at a temperature of 25° C. As illustrated in FIG. 2, the ionic conductivity increased at 30° C. when the poly-Aclb content enlarged, but was substantially constant at 80° C. even when the poly-Aclb content enlarged.

As a result, it is understood that the polymer electrolyte films with the composite oxide added produce an advantage that the ionic conductivity is improved at low temperatures when the hyperbranched polymer is compounded with the substrate polymer.

Specifically, the polymer electrolyte film, in which the hyperbranched polymer was compounded with the substrate polymer in such a ratio that PEO/poly-Aclb=80/20 by weight, exhibited ionic conductivities of 5×10$^{-3}$ S/cm at 80° C. and 3×10$^{-4}$ S/cm at 30° C.

EXAMPLE NO. 2

Except that PEO whose molecular weight was 60×10$^4$ was used, polymer electrolyte films of Example No. 2 were prepared with the same poly-Aclb compounding proportions as those of Example No. 1. The resulting polymer electrolyte films were examined for the ionic conductivity in the same manner as Example No. 1.

Figure 3:
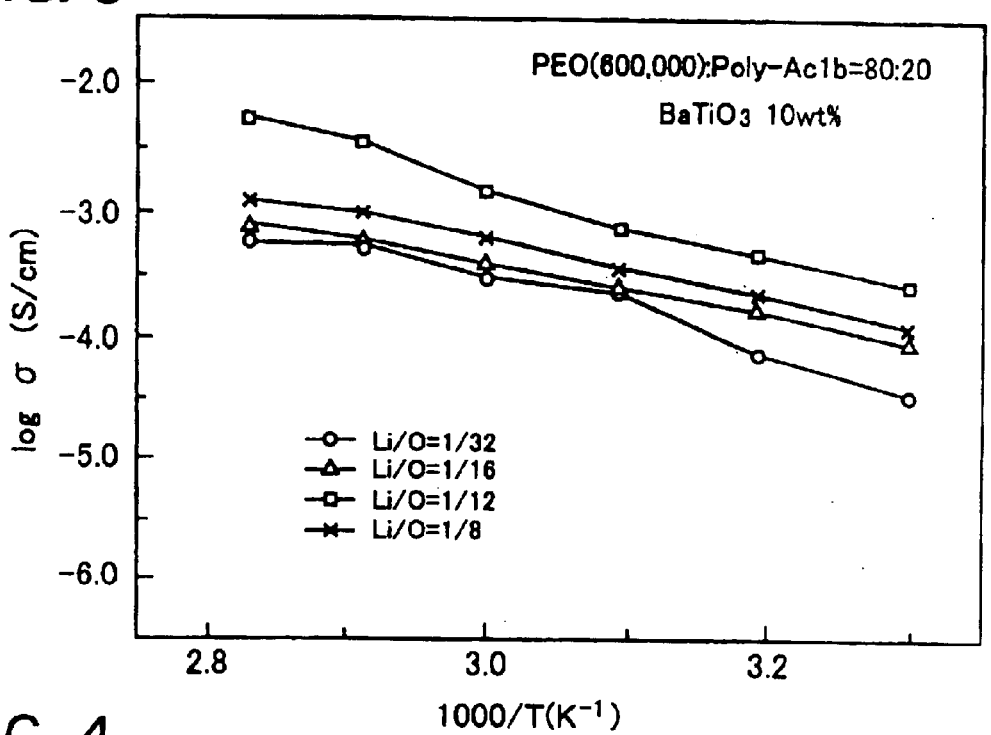
FIG. 3 is a graph for illustrating the temperature dependency of the ionic conductivity which was exhibited by a polymer electrolyte film according to Example No. 2.

In the polymer electrolyte films of Example No. 2, the molecular weight of the PEO (i.e., the substrate polymer) was smaller than that of Example No. 1. However, in Example No. 2 as well, it was appreciated that the ionic conductivity increased at 30° C. as the poly-Aclb (i.e., the hyperbranched polymer) content enlarged. FIG. 3 illustrates the temperature dependency of the ionic conductivity exhibited by the polymer electrolyte films of Example No. 2 in which the ratio of the PEO with respect to the poly-Aclb was 80:20 by weight (i.e., PEO/poly-Aclb=80/20 by weight). As illustrated in FIG. 3, the ionic conductivity showed the maximum value when the Li/O ratio was 1/12 by the number of atoms in the polymer electrolyte films of Example No. 2 in which BaTiO$_3$ (i.e., the composite oxide) was added in an amount of 10% by weight with respect to the entire polymer electrolyte film taken as 100% by weight.

Figure 4:
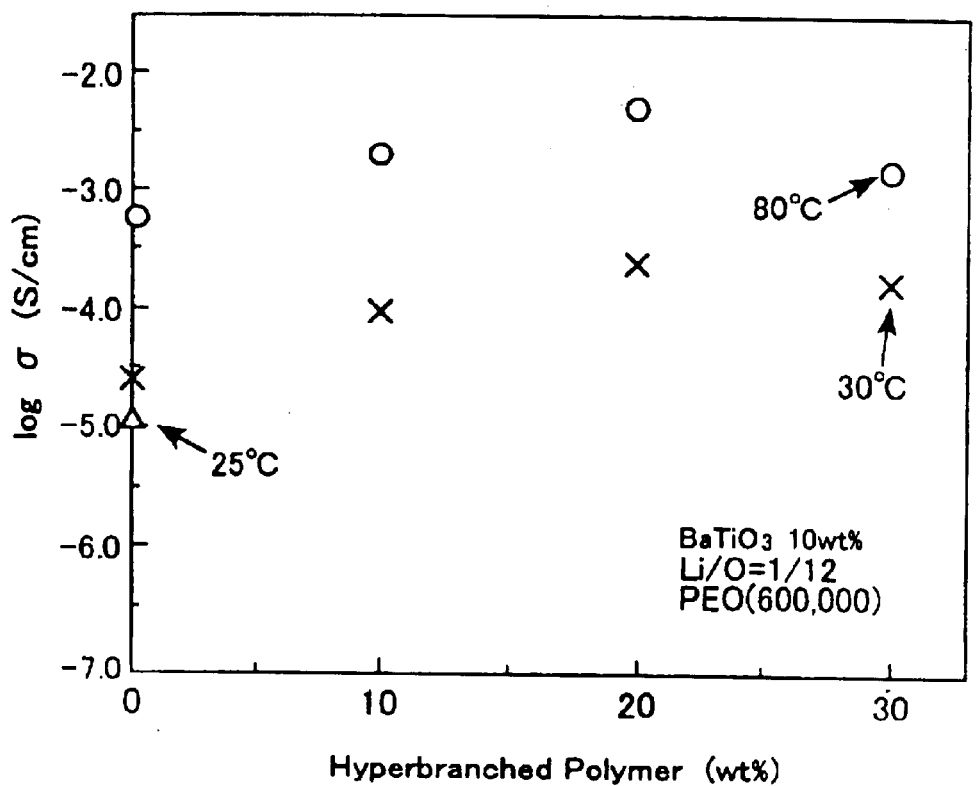
FIG. 4 is a graph for illustrating the dependency of the ionic conductivity with the addition of a hyperbranched polymer, dependency which was exhibited by the polymer electrolyte film according to Example No. 2.

FIG. 4 is a graph for illustrating the variation of the ionic conductivity accompanied by the enlargement of the poly-Aclb (i.e., hyperbranched polymer) content in the polymer electrolyte films in which the Li/O ratio was fixed at 1/12 by the number of atoms. In FIG. 4, the horizontal axis specifies the content of the poly-Aclb (e.g., 0% by weight, 10% by weight, 20% by weight and 30% by weight with respect to the polymer composite of the PEO and poly-Aclb taken as 100% by weight), and the vertical axis specifies the logarithm of the ionic conductivity. Note that the measurement of the ionic conductivity was carried out at a temperature of 30° C. marked with X and 80° C. marked with ○. Moreover, the data marked with Δ was exhibited by the electrolyte polymer film free from the poly-Aclb addition at a temperature of 25° C. As illustrated in FIG. 4, the ionic conductivity showed the maximum value when the poly-Aclb content was 20% by weight with respect to the polymer composite of the PEO and poly-Aclb taken as 100% by weight. Specifically, the maximum ionic conductivity was 7×10⁻³ S/cm at 80° C. and 4×10⁻⁴ S/cm at 30° C.

From the above-described results, it is understood that the ionic conductivity increases when the hyperbranched polymer is added to the polymer electrolyte films with the composite oxide added. In particular, the addition of the hyperbranched polymer is very effective in improving the ionic conductivity in a low temperature region.

The ionic conductivity depends on the molecular weight of the PEO (i.e., the substrate polymer) and the Li/O ratio (i.e., the content of lithium ions). For example, in Example No. 2 in which the PEO whose molecular weight was 60×10⁴ was used, the high ionic conductivities were obtained both at a low temperature (e.g., 30° C.) and at a high temperature (e.g., 80° C.) when the poly-Aclb content was 20% by weight with respect to the polymer composite of the PEO and poly-Aclb taken as 100% by weight and the Li/O ratio was 1/12 by the number of atoms. In Example No. 1 in which the PEO whose molecular weight was 200×10⁴ was used, the high ionic conductivities were obtained both at the low temperature and at the high temperature when the poly-Aclb content fell in a range of from 20 to 30% by weight with respect to the polymer composite of the PEO and poly-Aclb taken as 100% by weight and the Li/O ratio was 1/12 by the number of atoms. However, when the Li/O ratio was set constant, it was appreciated that the ionic conductivity tended to lower as the molecular weight of the PEO enlarged.

EXAMPLE NO. 3

Except that the lithium salt was changed to $Li(C_2F_5SO_2)_2N$, polymer electrolyte films of Example No. 3 were prepared with the same poly-Aclb compounding proportions as those of Example No. 1. The resulting polymer electrolyte films were examined for the ionic conductivity in the same manner as Example No. 1.

In the polymer electrolyte films of Example No. 3 in which the PEO (i.e., the substrate polymer) whose molecular weight was 200×10⁴ was used, the poly-Aclb (i.e., the hyperbranched polymer) was compounded in an amount of 10 or 20% by weight with respect to the polymer composite of the PEO and poly-Aclb taken as 100% by weight and included $BaTiO_3$ (i.e., the composite oxide), the ionic conductivities reached the maximum value when the Li/O ratio was 1/16 by the number of atoms. On the other hand, the ionic conductivity inclined to lower when the Li/O ratio was 1/12 or 1/6 by the number of atoms. Moreover, the ionic conductivity showed the maximum value in the polymer electrolyte film in which the poly-Aclb was compounded in an amount of 30% by weight with respect to the polymer composite of the PEO and poly-Aclb taken as 100% by weight and the composite oxide was included when the Li/O ratio was 1/12 by the number of atoms.

Figure 5:
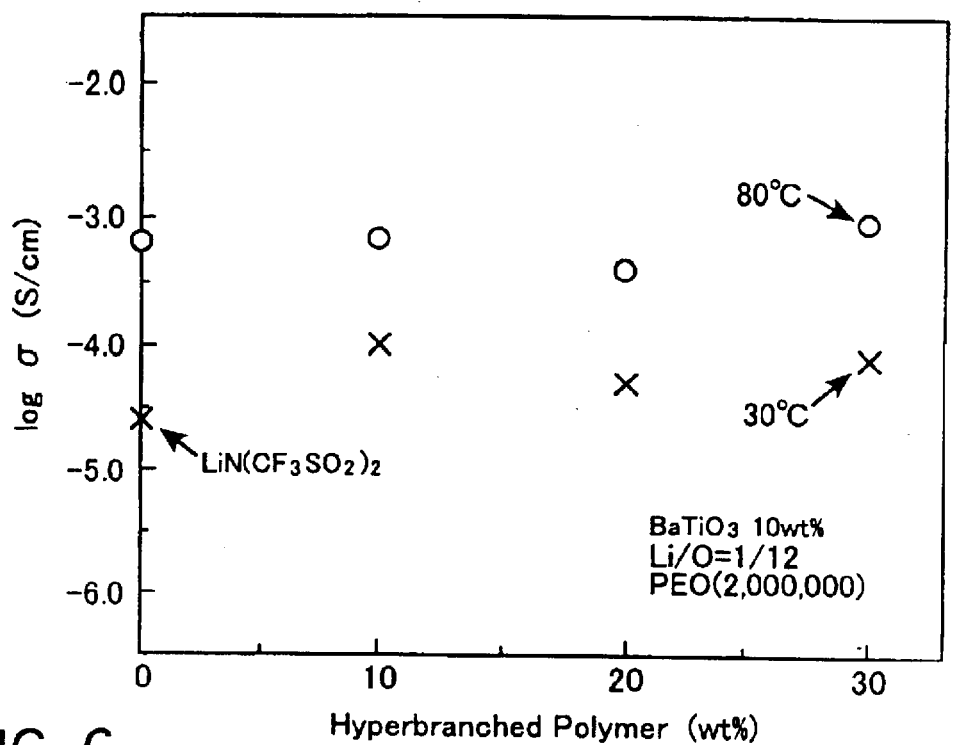
FIG. 5 is a graph for illustrating the dependency of the ionic conductivity with the addition of a hyperbranched polymer, dependency which was exhibited by a polymer electrolyte film according to Example No. 3.

FIG. 5 is a graph for illustrating the variation of the ionic conductivity accompanied by the enlargement of the poly-Aclb (i.e., hyperbranched polymer) content in the polymer electrolyte films of Example No. 3 in which the Li/O ratio was fixed at 1/12 by the number of atoms. In FIG. 5, the horizontal axis specifies the content of the poly-Aclb (e.g., 0% by weight, 10% by weight, 20% by weight and 30% by weight with respect to the polymer composite of the PEO and poly-Aclb taken as 100% by weight), and the vertical axis specifies the logarithm of the ionic conductivity. Note that the measurement of the ionic conductivity was carried out at a temperature of 30° C. marked with X and 80° C. marked with ○.

As illustrated in FIG. 5, the ionic conductivities were virtually constant at a high temperature (e.g., 80° C.) and at a low temperature (e.g., 30° C.) when the content of the poly-Aclb (i.e., the hyperbranched polymer) fell in a range of from 10 to 30% by weight. As a result, similarly to Example No. 1 in which $Li(CF_3SO_2)_2N$ was used, it is understood that the ionic conductivity increases when the hyperbranched polymer is added, and that the addition of the hyperbranched polymer is very effective in improving the ionic conductivity at low temperatures.

Specifically, the polymer electrolyte film, in which the poly-Aclb (i.e., the hyperbranched polymer) was compounded in an amount of 30% by weight with respect to the polymer composite of the PEO and poly-Aclb taken as 100% by weight and the Li/O ratio was 1/12 by the number of atoms, exhibited ionic conductivities of 9.5×10⁻⁴ S/cm at 80° C. and 9×10⁻⁵ S/cm at 30° C.

EXAMPLE NO. 4

Except that the lithium salt was changed to $Li(C_2F_5SO_2)_2N$, polymer electrolyte films of Example No. 4 were prepared with the same poly-Aclb compounding proportions as those of Example No. 2. The resulting polymer electrolyte films were examined for the ionic conductivity in the same manner as Example No. 1.

In the polymer electrolyte films of Example No. 4 in which the poly-Aclb (i.e., the hyperbranched polymer) was compounded in an amount of 10%, 20% and 30% by weight, respectively, with respect to the polymer composite of the PEO and poly-Aclb taken as 100% by weight and included $BaTiO_3$ (i.e., the composite oxide), the ionic conductivity increased gradually as the $Li(C_2F_5SO_2)_2N$ (i.e., the lithium salt) content enlarged. The ionic conductivity reached the maximum when the Li/O ratio was 1/12 by the number of atoms, but tended to lower slightly when the Li/O ratio was 1/8 by the number of atoms. Moreover, it was appreciated that the ionic conductivity increased at a high temperature (e.g., 80° C.) as well as at a low temperature (e.g., 30° C.) as the poly-Aclb content enlarged from 10% to 20% with respect to the polymer composite of the PEO and poly-Aclb taken as 100% by weight in the polymer electrolyte films.

Figure 6:
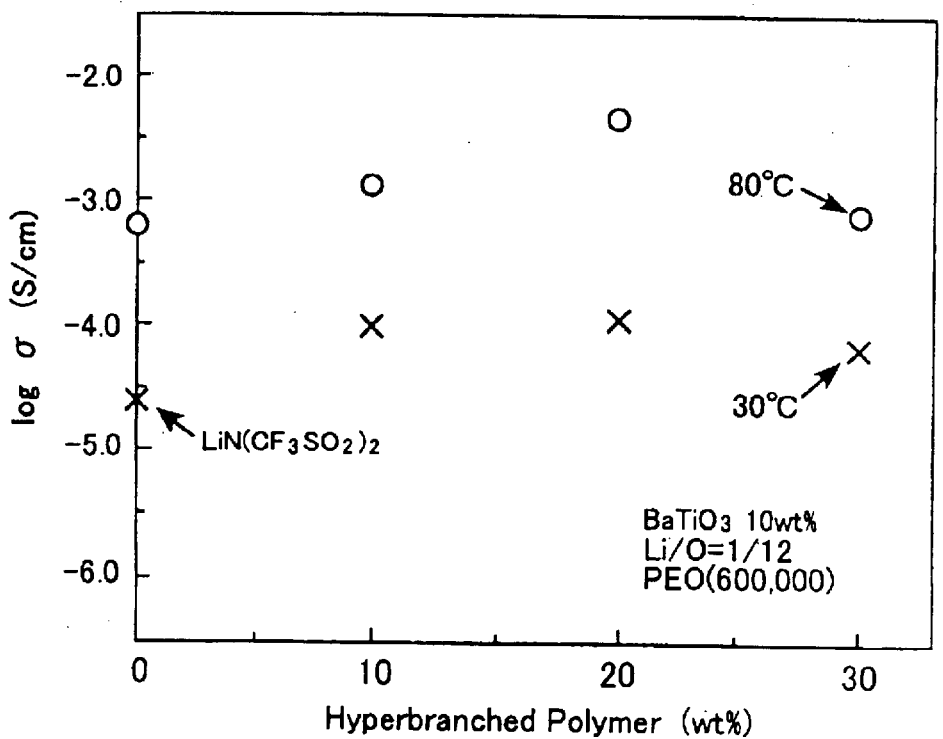
FIG. 6 is a graph for illustrating the dependency of the ionic conductivity with the addition of a hyperbranched polymer, dependency which was exhibited by a polymer electrolyte film according to Example No. 4.

However, in the polymer electrolyte film of Example No. 4 in which the poly-Aclb (i.e., the hyperbranched polymer) content was 30% by weight with respect to the polymer composite of the PEO and poly-Aclb taken as 100% by weight, the ionic conductivity lowered both at the high temperature and low temperature. FIG. 6 is a graph for illustrating the variation of the ionic conductivity accompanied by the enlargement of the poly-Aclb content in the polymer electrolyte films of Example No. 4 in which the Li/O ratio was fixed at 1/12 by the number of atoms. In FIG. 6, the horizontal axis specifies the content of the poly-Aclb (e.g., 0% by weight, 10% by weight, 20% by weight and 30% by weight with respect to the polymer composite of the PEO and poly-Aclb taken as 100% by weight), and the vertical axis specifies the logarithm of the ionic conductivity. Note that the measurement of the ionic conductivity was carried out at a temperature of 30° C. marked with X and 80° C. marked with ○.

Specifically, the polymer electrolyte film, in which the poly-Aclb (i.e., the hyperbranched polymer) was compounded in an amount of 20% by weight with respect to the polymer composite of the PEO and poly-Aclb taken as 100% by weight, exhibited ionic conductivities of 7×10⁻³ S/cm at 80° C. and 1×10⁻⁴ S/cm at 30° C.

In the polymer electrolyte films of Example No. 4 in which $Li(C_2F_5SO_2)_2N$ was used as the lithium salt, the ionic conductivity was lowered compared with the ionic conductivity exhibited by the polymer electrolyte films of Example No. 2 in which $Li(CF_3SO_2)_2N$ was used as the lithium salt. From the result, it was appreciated that the ionic conductivity was affected by the difference regarding the types of the used lithium salts. Moreover, similarly to the polymer electrolyte films of Example No. 2 in which $Li(CF_3SO_2)_2N$ was used, it was recognized that the ionic conductivity inclined to lower as the molecular weight of the PEO (i.e., the substrate polymer) enlarged in the polymer electrolyte films of Example No. 4 in which $Li(C_2F_5SO_2)_2N$ was used when the Li/O ratio by the number of atoms was constant therein.

EXAMPLE NO. 5

Figure 7:
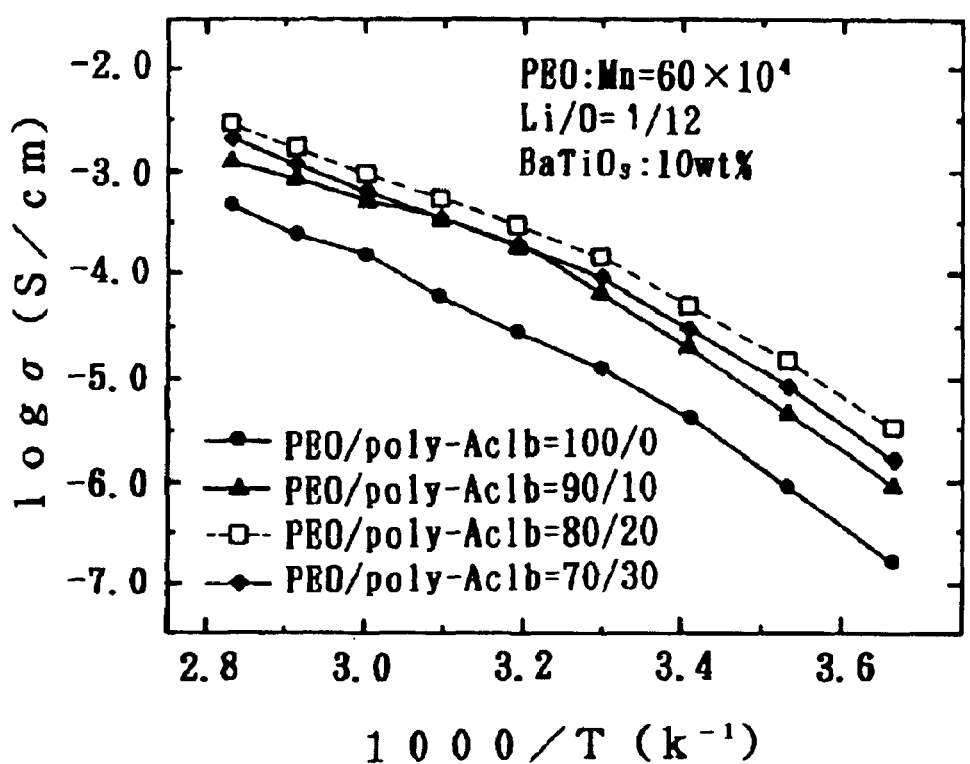
FIG. 7 is a graph for illustrating the temperature dependency of the ionic conductivity which was exhibited when the compounding proportion of a substrate polymer and a hyperbranched polymer was varied in a polymer electrolyte film according to Example No. 5.

In Example No. 5, PEO whose molecular weight was $60 \times 10^4$ was used as the substrate polymer. $Li(CF_3SO_2)_2N$ was used as the lithium salt in such an amount that the Li/O ratio was 1/12 by the number of atoms. $BaTiO_3$ was used as the composite oxide in an amount of 10% by weight with respect to the entire polymer electrolyte film taken as 100% by weight. The poly-Aclb was used as the hyperbranched polymer, and was compounded in an amount of 0%, 10%, 20% and 30% by weight with respect to the polymer composite of the PEO and poly-Aclb taken as 100% by weight, i.e., the PEO/poly-Aclb ratio was 100/0, 90/10, 80/20 and 70/30 by weight, respectively. The resulting 4 polymer electrolyte films were examined for the ionic conductivity. FIG. 7 illustrates the temperature dependency of the ionic conductivity exhibited by the polymer electrolyte films of Example No. 5. As can be seen from FIG. 7, it was appreciated that the ionic conductivity tended to increase as the compounding proportion of the poly-Aclb was enlarged. Among the polymer electrolyte films, the polymer electrolyte film in which the compounding proportion of the poly-Aclb was 20% by weight with respect to the polymer composite of the PEO and poly-Aclb taken as 100% by weight, i.e., the PEO/poly-Aclb ratio was 80/20 by weight, exhibited the highest ionic conductivity.

EXAMPLE NO. 6

In Example No. 6, PEO whose molecular weight was $500 \times 10^4$ was used as the substrate polymer. The poly-Aclb was used as the hyperbranched polymer, and was compounded in an amount of 20% by weight with respect to the polymer mixture of the PEO and poly-Aclb taken as 100% by weight, i.e., the PEO/poly-Aclb ratio was 80/20 by weight. $\alpha$-$LiAlO_2$ and $\gamma$-$LiAlO_2$ were used as the composite oxide. The $\alpha$-$LiAlO_2$ had particle diameters falling in a range of from 10 to 20 nm, and was used in an amount of 10% by weight with respect to the entire polymer electrolyte film taken as 100% by weight. The $\gamma$-$LiAlO_2$ had particle diameters falling in a range of from 100 to 200 nm, and was used in an amount of 10% and 20% by weight with respect to the entire polymer electrolyte film taken as 100% by weight, respectively. $Li(CF_3SO_2)_2N$ was used as the lithium salt in such an amount that the Li/O ratio was 1/12 by the number of atoms. The resulting 3 polymer electrolyte films were examined for the ionic conductivity at 80° C. Table 1 below sets forth the ionic conductivity for every type of the composite oxides for comparison.

TABLE 1

| Original Polymer Mixture (PEO/Poly-Aclb Ratio = 80/20 by weight) | Polymer Electrolyte Film with 10% by Weight $\alpha$-$LiAlO_2$ Added | Polymer Electrolyte Film with 10% by Weight $\gamma$-$LiAlO_2$ Added | Polymer Electrolyte Film with 20% by Weight $\gamma$-$LiAlO_2$ Added |
|---|---|---|---|
| $6.3 \times 10^{-4}$ S/cm | $8.9 \times 10^{-4}$ S/cm | $5.9 \times 10^{-4}$ S/cm | $3.6 \times 10^{-4}$ S/cm |

As summarized in Table 1, the polymer electrolyte film with 10% by weight $\alpha$-$LiAlO_2$ added was improved more than the original polymer mixture free from the addition in terms of the ionic conductivity at 80° C. Therefore, it is understood that the addition of the composite oxide is effective to improve the ionic conductivity. However, in the polymer electrolyte films with the $\gamma$-$LiAlO_2$ added, no ionic conductivity improvement was appreciated. Thus, it is recognized that the type of the composite oxides affects the ionic conductivity improvement. Moreover, the polymer electrolyte film with 20% by weight $\gamma$-$LiAlO_2$ added showed the more lowered ionic conductivity.

Figure 8:
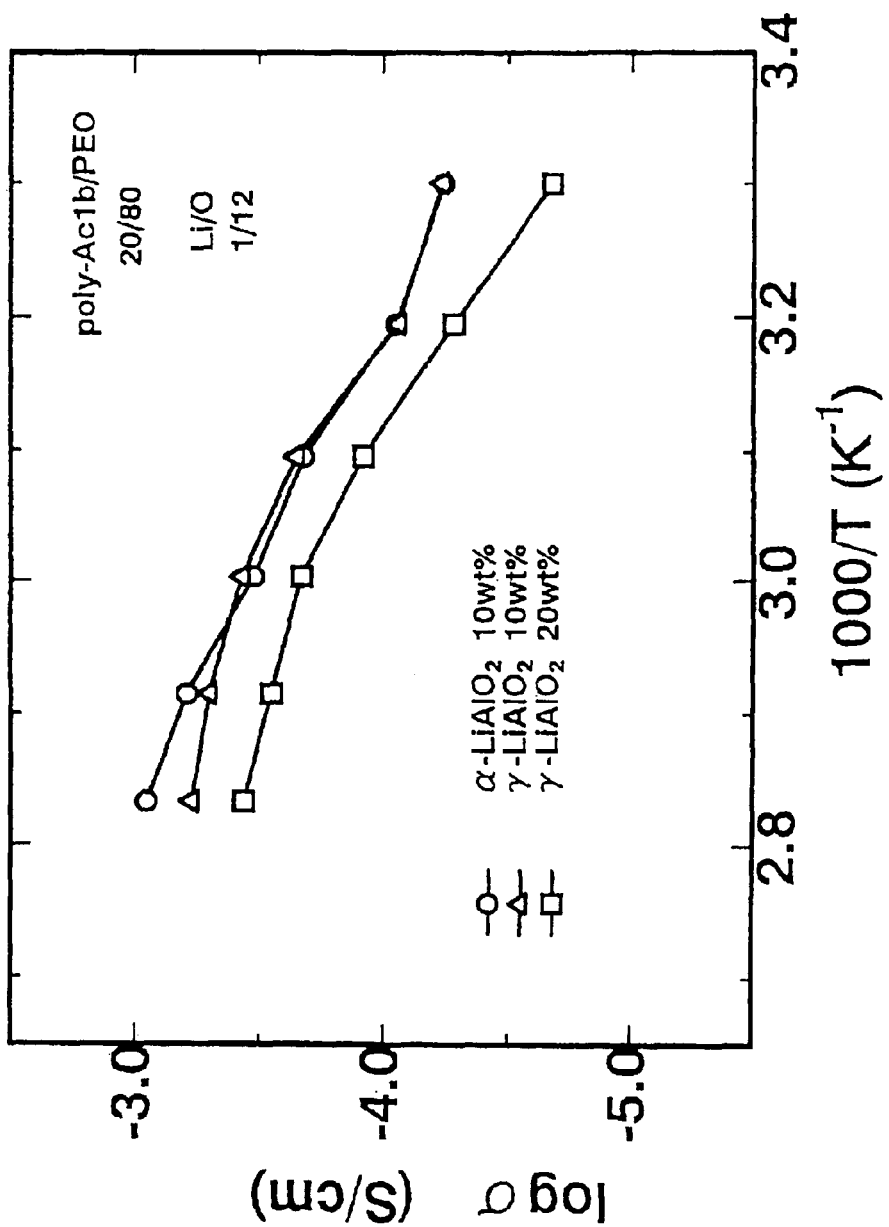
FIG. 8 is a graph for illustrating the temperature dependency of the ionic conductivity which was exhibited by a polymer electrolyte film according to Example No. 6 including a composite oxide and a hyperbranched polymer.

FIG. 8 is a graph for illustrating the temperature dependency of the ionic conductivity exhibited by the polymer electrolyte films of Example No. 6. Moreover, FIG. 8 is a graph for showing how the ionic conductivity of the polymer electrolyte films was affected when the $\alpha$-$LiAlO_2$ and $\gamma$-$LiAlO_2$ were added.

As can be seen from FIG. 8, when the composite oxides were added in an identical amount, the ionic conductivities of the polymer electrolyte films showed substantially similar temperature dependencies with each other regardless of the type of the composite oxides. However, when the $\gamma$-$LiAlO_2$ was added in a large amount, the resulting polymer electrolyte film exhibited the more lowered ionic conductivity.

Figure 9:
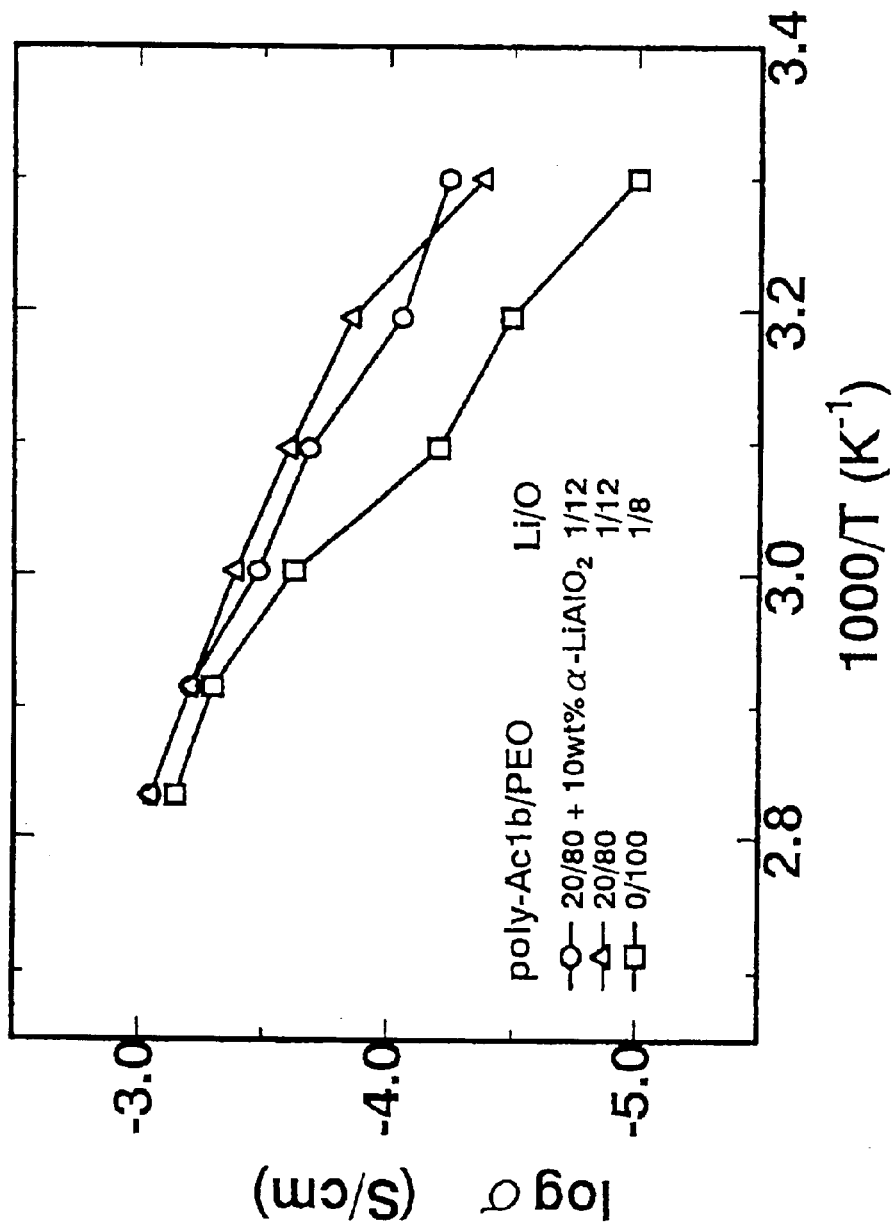
FIG. 9 is graph for illustrating the temperature dependency of the ionic conductivity which was exhibited when the addition of the hyperbranched polymer was varied and when the composite oxide was not added in the polymer electrolyte film according to Example No. 6.

In FIG. 9, the graph illustrates how the ionic conductivities of the polymer electrolyte films depended on the temperature when the $\alpha$-$LiAlO_2$ was added and when it was not added. As can be seen from the graph, in the polymer electrolyte films, the temperature, at which the activation energy for the ionic conduction varied, tended to shift to lower temperatures when the composite oxide was added.

EXAMPLE NO. 7

In Example No. 7, $Li(CF_3SO_2)_2N$ was used as the lithium salt in such an amount that the Li/O ratio was 1/15 by the number of atoms. $BaTiO_3$ was used as the composite oxide. The $BaTiO_3$ had an average particle diameter 0.5 $\mu$m, and was used in an amount of 10% by weight with respect to the entire polymer electrolyte film taken as 100% by weight. An EO-PO copolymer was used as the substrate polymer. The EO-PO copolymer had a molecular weight of $83 \times 10^4$. When the EO-PO comprised EO whose polymerization degree was n and PO whose polymerization degree was m, the n/m ratio was 90/10 by mol. The poly-Aclb whose molecular weight was $2.5 \times 10^4$ was used as the hyperbranched polymer, and was compounded in an amount of 20% by weight with respect to the polymer mixture of the EO-PO copolymer and poly-Aclb taken as 100% by weight. The resulting mixture was solved and dispersed in acetonitrile. The resultant mixture solution was subjected to a casting method to prepare a polymer electrolyte film. Moreover, a mixture solution free from the poly-Aclb addition was prepared as well, and was likewise subjected to the casting method to prepare a comparative polymer electrolyte film.

Figure 10:
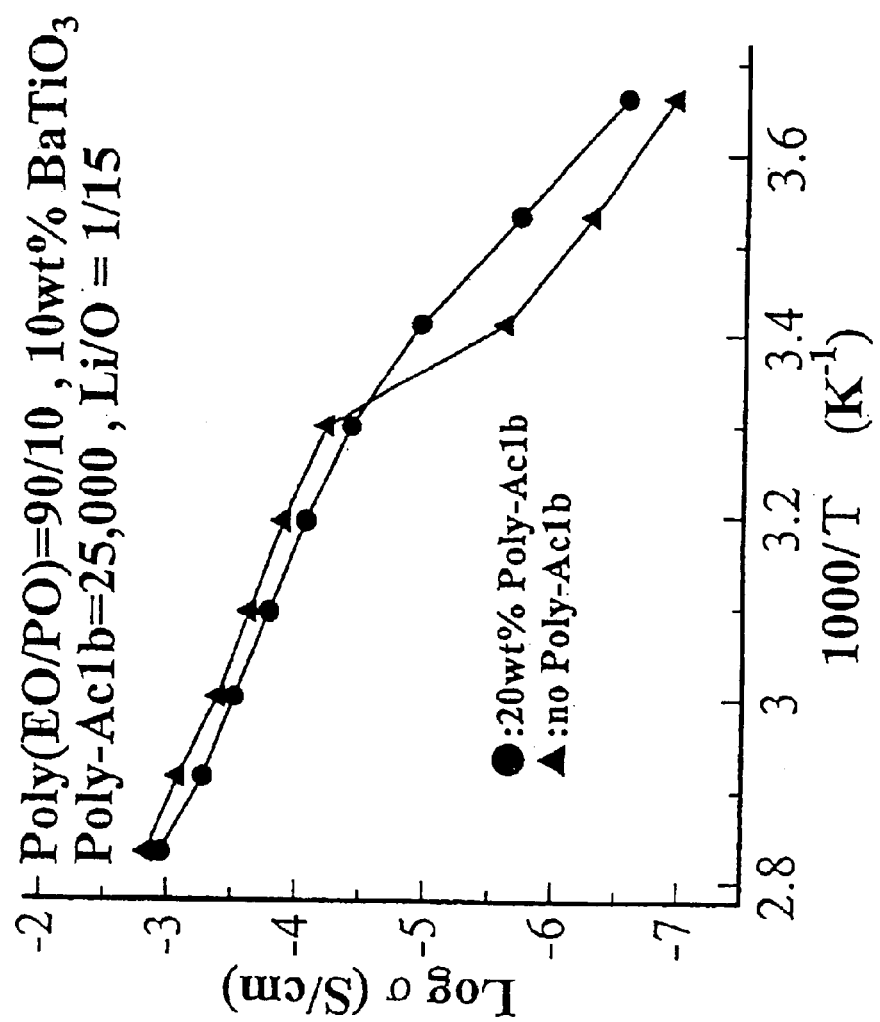
FIG. 10 is a graph for illustrating the temperature dependency of the ionic conductivity which was exhibited when a copolymer is used for the substrate polymer of a polymer electrolyte film according to Example No. 7.

The ionic conductivity of the thus prepared polymer electrolyte films was measured in a temperature range of from 0 to 80° C. The temperature dependencies of the measured ionic conductivities were examined in the same manner as Example No. 1. FIG. 10 illustrates the results of the examination.

As illustrated in FIG. 10, in a low temperature region of from 0 to 20° C., the curve, which specifies the temperature dependency of the ionic conductivity exhibited by the polymer electrolyte film with the hyperbranched polymer added, lies above the curve, which specifies the temperature dependency of the ionic conductivity exhibited by the polymer electrolyte film without the hyperbranched polymer addition. Thus, even when the EO-PO copolymer is used as the substrate polymer, it is possible to recognize that the ionic conductivity is improved by adding the hyperbranched polymer.

EXAMPLE NO. 8

Figure 11:
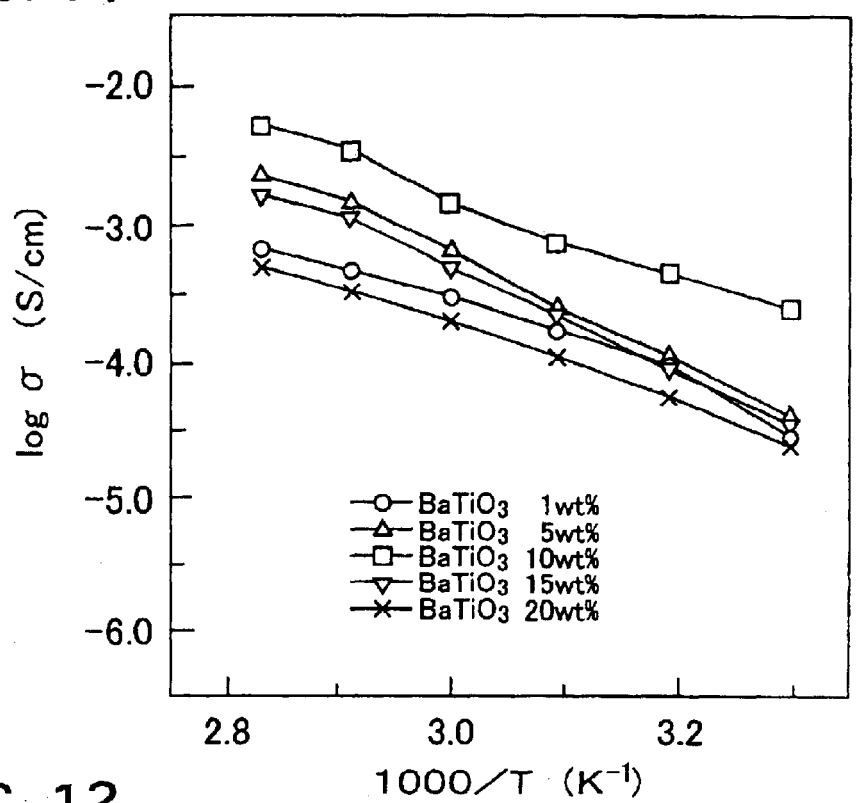
FIG. 11 is a graph for illustrating the temperature dependency of the ionic conductivity which was exhibited when the addition of $BaTiO_3$ was varied in a polymer electrolyte film according to Example No. 8.

In Example No. 8, $Li(CF_3SO_2)_2N$ was used as the lithium salt in such an amount that the Li/O ratio was 1/12 by the number of atoms. PEO whose molecular weight was $60 \times 10^4$ was used as the substrate polymer. The poly-Aclb whose molecular weight was $2.5 \times 10^4$ was used as the hyperbranched polymer. 20% by weight of the poly-Aclb was compounded with 80% by weight of the PEO to make a polymer mixture. The mixture of the $Li(CF_3SO_2)_2N$ and the polymer mixture was further compounded with $BaTiO_3$ which was used as the composite oxide. The $BaTiO_3$ had an average particle diameter of 0.5 μm, and was used in an amount of 1%, 5%, 15% and 20% by weight with respect to the entire polymer electrolyte film taken as 100% by weight, respectively. Each of the resulting 4 mixtures was solved and dispersed in acetonitrile. Thus, 4 mixture solutions were prepared. Table 2 below summarizes the compositions of the 4 mixture solutions. The resultant mixture solutions were subjected to a casting method. Hence, as set forth in Table 2, 4 polymer electrolyte films were prepared in which the $BaTiO_3$ content was varied. The thus prepared polymer electrolyte films were examined for the ionic conductivity in a temperature range of from 0 to 80° C. in the same manner as Example No. 1. FIG. 11 illustrates the temperature dependencies of the ionic conductivity which was exhibited by the 4 polymer electrolyte films in the temperature range.

TABLE 2

| Sample I.D. | Substrate Polymer, % by weight (Actual Weight in g) | Hyper-Branched Polymer, % by weight (Actual Weight in g) | Lithium Salt, Actual Weight in g | Composite Oxide, % by weight (Actual Weight in g) | Solvent, in mL |
|---|---|---|---|---|---|
| #1 | 80 (0.320) | 20 (0.080) | 0.208 | 1 (0.006) | 15 |
| #2 | 80 (0.344) | 20 (0.086) | 0.224 | 5 (0.030) | 15 |
| #3 | 80 (0.296) | 20 (0.074) | 0.193 | 15 (0.084) | 15 |
| #4 | 80 (0.344) | 20 (0.086) | 0.224 | 20 (0.131) | 15 |

As can be seen from FIG. 11, regardless of the $BaTiO_3$ addition, the temperature dependency of the ionic conductivity was linear in all of the polymer electrolyte films. Moreover, concerning the activation energy for the ionic conduction, the polymer electrolyte film with 1% by weight $BaTiO_3$ added exhibited 23.7 kJ/kmol, the polymer electrolyte film with 5% by weight $BaTiO_3$ added exhibited 30.8 kJ/kmol, and the polymer electrolyte film with 20% by weight $BaTiO_3$ added exhibited 23.6 kJ/kmol.

Figure 12:
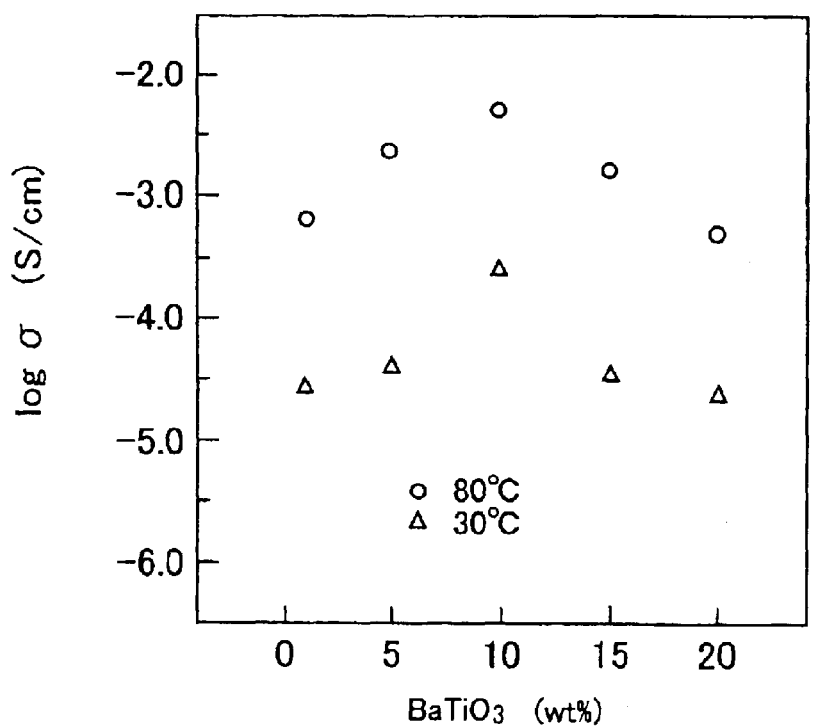
FIG. 12 is a graph for illustrating the relationship between the $BaTiO_3$ addition and the ionic conductivity which was exhibited by a polymer electrolyte film according to Example No. 8 at 80° C. and 30° C.

In addition, FIG. 12 illustrates the relationships between the $BaTiO_3$ additions and the ionic conductivities at 80° C. and 30° C. The ionic conductivities varied clearly with respect to the $BaTiO_3$ additions. Specifically, the ionic conductivities increased when the $BaTiO_3$ addition enlarged up to 10% by weight. When the $BaTiO_3$ was added to the polymer electrolyte film in an amount of more than 10% by weight, such additions hinder the movement of lithium ions. Therefore, in view of the ionic conductivity, it is understood that an optimum $BaTiO_3$ addition is 10% by weight with respect to the entire polymer electrolyte film taken as 100% by weight.

Polymer Lithium Battery

Concerning an electrolyte salt for PEO polymer electrolyte films, it is believed that $Li(CF_3SO_2)_2N$ is an optimum option when taking the thermal stability, conductivity and interface resistance into consideration. However, it has been noted that stainless steel and aluminum used in batteries inclined to react with electrolyte salts to form highly resistant films at high temperatures (e.g., 80° C. or more). Accordingly, $Li(C_2F_5SO_2)_2N$ has been further investigated over the adaptability to lithium polymer electrolyte films. Compared with $Li(CF_3SO_2)_2N$, $Li(C_2F_5SO_2)_2N$ exhibits a slightly lowered interface resistance to aluminum. However, regarding the interface resistance between metallic lithium and polymer electrolytic films as well as the interface resistance between positive electrode compositions and polymer electrolyte films, both $Li(CF_3SO_2)_2N$ and $Li(C_2F_5SO_2)_2N$ have not produced no appreciable differences. Moreover, compared with $Li(CF_3SO_2)_2N$, $Li(C_2F_5SO_2)_2N$ exhibits a lowered ionic conductivity.

In addition, aluminum foils used as the current collectors of positive electrodes react with positive electrode compositions to enlarge the interface resistance between the aluminum foils and positive electrodes. Since $LiPF_6$ is likely to form fluorides on the surface of aluminum, it is believed to inhibit the reaction. Hence, the effect of the $LiPF_6$ was examined when it was added to electrolyte salts in a trace amount. Table 3 below summarizes the interface resistances when positive electrode compositions contacted with aluminum, an aluminum foil and platinum for 23 days.

TABLE 3

| Positive Electrode Composition (% by weight) | | | | Al with Lithium 99.99% | | |
|---|---|---|---|---|---|---|
| $LiNi_{0.8}Co_{0.2}O_2$ | PEO | AB | Salt | Purity | Al Foil | Pt |
| 70 | 15 | 15 | None | 2 Ω | 2 Ω | Not Measured |
| 65 | 20 | 15 | Li-imide | 100 Ω | 160 Ω | 2 Ω |
| 65 | 20 | 15 | Li-Beti | 40 Ω | 110 Ω | 2 Ω |
| 65 | 20 | 15 | 90% by weight Li-Beti-10% by weight $LiPF_6$ | 33 Ω | 75 Ω | Not Measured |

Note:
"Li-imide" stands for $Li(CF_3SO_2)_2N$.
"Li-Beti" stands for $Li(C_2F_5SO_2)_2N$.
"AB" stands for acetylene black.

As can be appreciated from Table 3, compared with the lithium salts free from the $LiPF_6$ addition, the interface resistance between the aluminum and positive electrode was inhibited from enlarging when LiPF$_6$ was added in an amount of 10% by weight with respect to the entire composite lithium salt taken as 100% by weight. Thus, it is understood that it is effective to use the composite lithium salts in which LiPF$_6$ is added to the lithium salts in order to reduce the interface resistance between the aluminum and positive electrode.

Table 4 below sets forth the ionic conductivities which were exhibited by polymer electrolyte films, in which the LiPF$_6$ addition was varied, at 80° C. and 25° C.

TABLE 4

| Composition of Polymer Electrolyte Film | LiPF$_6$ addition (% by weight) | Ionic Conductivity at 80° C. (S/cm) | Ionic Conductivity at 25° C. (S/cm) |
|---|---|---|---|
| 12% by weight PEO- Li (C$_2$F$_5$SO$_2$)$_2$N- 10% by weight BaTiO$_3$ | 0% | 1.24 × 10$^{-3}$ | 6.53 × 10$^{-6}$ |
|  | 5% | 0.66 × 10$^{-3}$ | 2.70 × 10$^{-6}$ |
|  | 10% | 0.52 × 10$^{-3}$ | 2.56 × 10$^{-6}$ |
|  | 15% | 0.70 × 10$^{-3}$ | 2.11 × 10$^{-6}$ |
| 20% by weight PEO- Li (CF$_3$SO$_2$)$_2$N- 10% by weight BaTiO$_3$ | 0% | 1.70 × 10$^{-3}$ | 7.90 × 10$^{-6}$ |
|  | 5% | 0.67 × 10$^{-3}$ | 1.66 × 10$^{-6}$ |
|  | 10% | 0.56 × 10$^{-3}$ | 1.25 × 10$^{-6}$ |
|  | 10% (LiClO$_4$ addition) | 0.70 × 10$^{-3}$ | 1.73 × 10$^{-6}$ |
| 19% by weight PEO- Li (CF$_3$SO$_2$)$_2$N- 10% by weight BaTiO$_3$ | 10% | 0.74 × 10$^{-3}$ | 11.7 × 10$^{-6}$ |

Note:
BaTiO$_3$ had an average particle diameter of 0.5 μm.

When LiPF$_6$ was added to the polymer electrolyte film which comprised PEO and Li(C$_2$F$_5$SO$_2$)$_2$N, the resulting polymer electrolyte films exhibited substantially lower ionic conductivities than the polymer electrolyte film which comprised PEO and Li(CF$_3$SO$_2$)$_2$N and to which LiPF$_6$ was added. Moreover, as can be seen from Table 4, it was recognized that not only the polymer electrolyte film which comprised PEO and Li(C$_2$F$_5$SO$_2$)$_2$N, but also the polymer electrolyte film which comprised PEO and Li(CF$_3$SO$_2$)$_2$N, showed the lowering ionic conductivities when the LiPF$_6$ addition enlarged. As a result, in view of the ionic conductivity, it is not effective to use the composite lithium salts in which LiPF$_6$ is added to the lithium salts.

Figure 13:
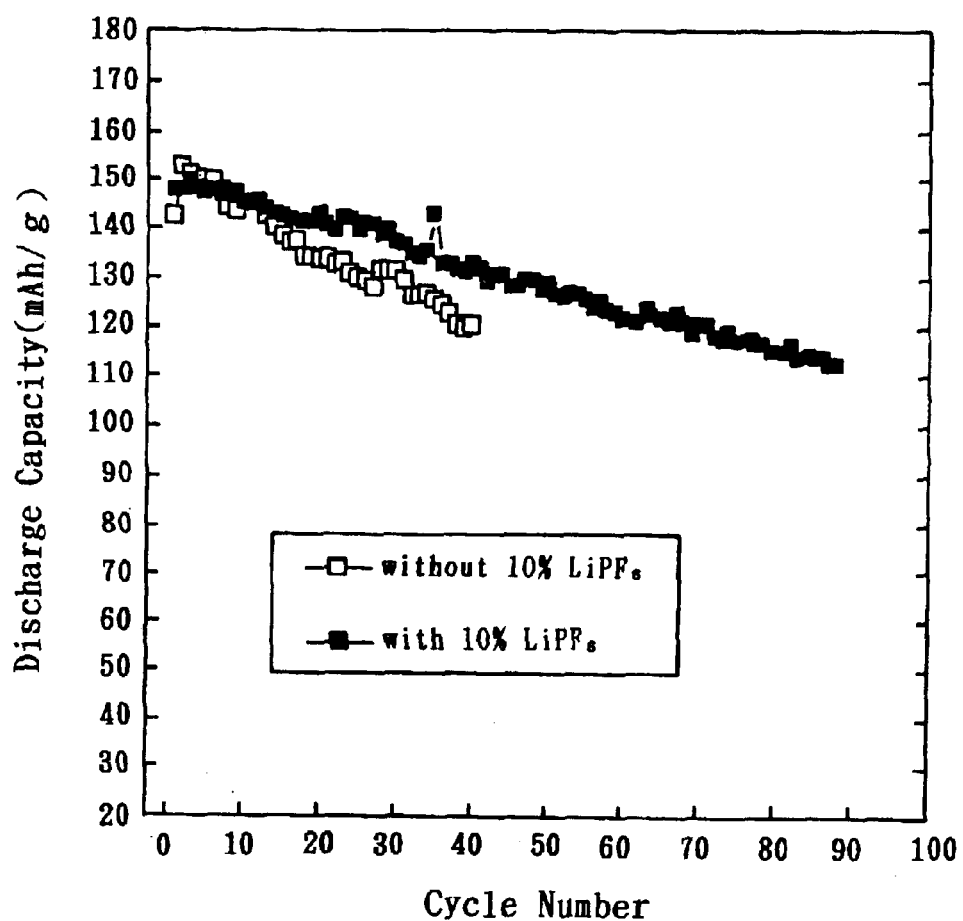
FIG. 13 is a graph for illustrating the cyclic characteristics which were exhibited by a polymer lithium battery, including a lithium salt (e.g., $Li(CF_3SO_2)_2N$) with $LiPF_6$ added, at 80° C., and by another polymer lithium battery, free from the $LiPF_6$ addition, thereat.

Button-shaped batteries were made by using the polymer electrolyte film recited in Table 4, in which 10% by weight LiPF$_6$ was added with respect to the entire Li(CF$_3$SO$_2$)$_2$N—LiPF$_6$ composite lithium salt taken as 100% by weight, as well as a polymer electrolyte film free from the LiPF$_6$ addition, respectively. The resulting button-shaped batteries were examined for the cyclic characteristic when they were charged and discharged with an electric current density I=0.2 mA/cm$^2$ at 80° C. In FIG. 13, the graph illustrates the resultant cyclic characteristics. As shown in FIG. 13, the cyclic characteristic of the button-shaped battery was improved when LiPF$_6$ was added in an amount of 10% by weight with respect to the entire Li(CF$_3$SO$_2$)$_2$N—LiPF$_6$ composite lithium salt taken as 100% by weight. It is believed that the advantage results from the fact that the interface resistance between the positive electrode and aluminum is inhibited from enlarging by the 10% by weight LiPF$_6$ addition.

Figure 14:
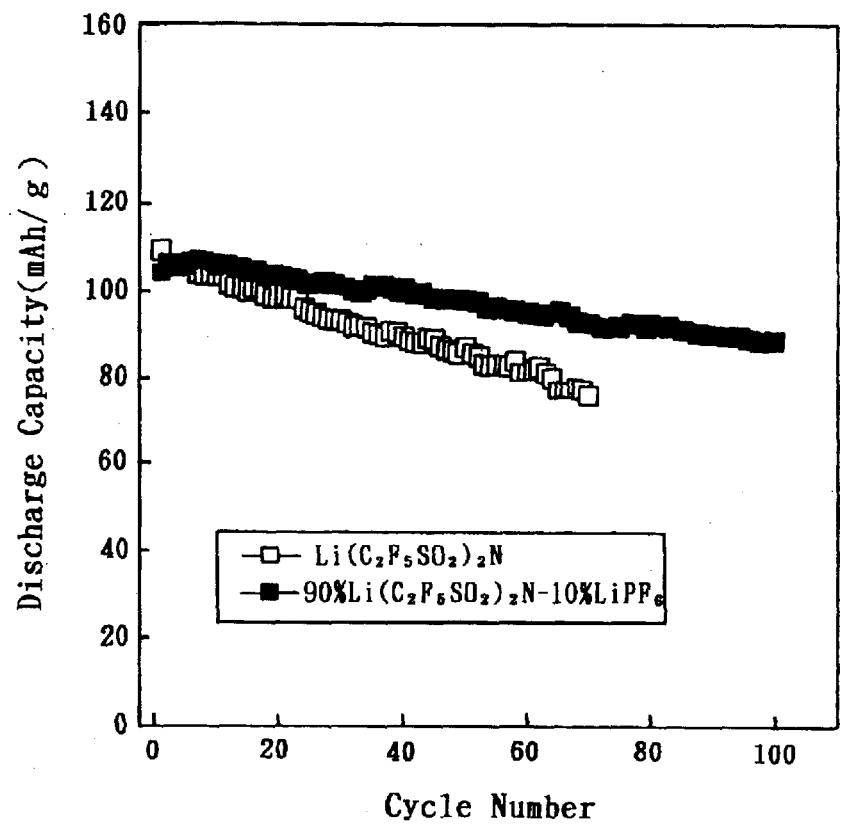
FIG. 14 is a graph for illustrating the cyclic characteristics which were exhibited by a polymer lithium battery, including a lithium salt (e.g., $Li(C_2F_5SO_2)_2N$) with $LiPF_6$ added, at 80° C., and by another polymer lithium battery, free from the $LiPF_6$ addition, thereat.

Moreover, button-shaped batteries were made by using the polymer electrolyte film recited in Table 4, in which 10% by weight LiPF$_6$ was added with respect to the entire Li(C$_2$F$_5$SO$_2$)$_2$N—LiPF$_6$ composite lithium salt taken as 100% by weight, as well as a polymer electrolyte film free from the LiPF$_6$ addition, respectively. The resulting button-shaped batteries were likewise examined for the cyclic characteristic when they were charged and discharged with an electric current density I=0.2 mA/cm$^2$ at 80° C. In FIG. 14, the graph illustrates the resultant cyclic characteristics illustrated in FIG. 13. In the button-shaped battery in which the Li(C$_2$F$_5$SO$_2$)$_2$N—LiPF$_6$ composite lithium salt was used exhibited the cyclic characteristic which tended to behave similarly to the cyclic characteristic. Namely, the cyclic characteristic of the button-shaped battery was improved likewise when LiPF$_6$ was added in an amount of 10% by weight with respect to the entire Li(C$_2$F$_5$SO$_2$)$_2$N—LiPF$_6$ composite lithium salt taken as 100% by weight. Specifically, the discharge capacity of the button-shaped battery lowered only from 110 to 90 mAh/g when the button-shaped battery was charged and discharged 100 cycles. The cyclic characteristic is believed to be good as for a solid battery.

EXAMPLE NO. 9

Battery Characteristics at Low Temperatures

Figure 15:
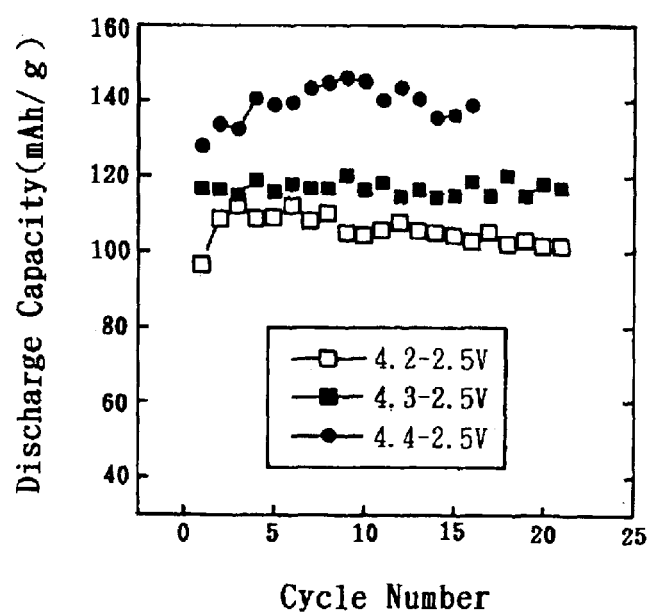
FIG. 15 is a graph for illustrating the charge-discharge cyclic characteristics of the positive electrode capacity, charge-discharge cyclic characteristics which were exhibited by a polymer lithium battery according to Example No. 9, including a lithium salt (e.g., $Li(CF_3SO_2)_2N$) with $LiPF_6$ added, when it was charged and discharged with an electric current density of 0.1 mA/cm$^2$ at 50° C.

A polymer lithium battery was made, and comprised an Li negative electrode, a polymer electrolyte, and an LiNi$_{0.8}$Co$_{0.2}$O$_2$ positive electrode. The polymer electrolyte comprised a 90% by weight polymer composite with a composite lithium salt, and 10% by weight BaTiO$_3$. The polymer composite comprised 90% by weight PEO, and 10% by weight poly-Aclb. The PEO had a molecular weight of 60×10$^4$. The poly-Aclb had a molecular weight of 2.5× 10$^4$. The composite lithium salt comprised 90% by weight Li(CF$_3$SO$_2$)$_2$N and 10% by weight LiPF$_6$. The thus constructed battery was charged and discharged with an electric current density I=0.1 mA/cm$^2$ at 50° C., and was thereby assessed for the cyclic characteristic of the positive electrode capacity. FIG. 15 illustrates the results of the assessment.

When the battery was charged and discharged with an electric current density of 0.1 mA/cm$^2$ (i.e., about 0.1 C), it produced such a high cut-off voltage, 4.4–2.5 V, as marked with the solid circles in FIG. 15, and such a high initial capacity as 140 mA/g. It produced such a high charge-termination voltage (or cut voltage) as 4.4 V, because the sum of the bulk resistance of the polymer electrolyte and the interface resistance between the polymer electrolyte and electrodes was so large that it was 1,000 Ω or more. As a result, it is understood that the battery can be charged and discharged stably with a high capacity at 50° C.

Figure 16:
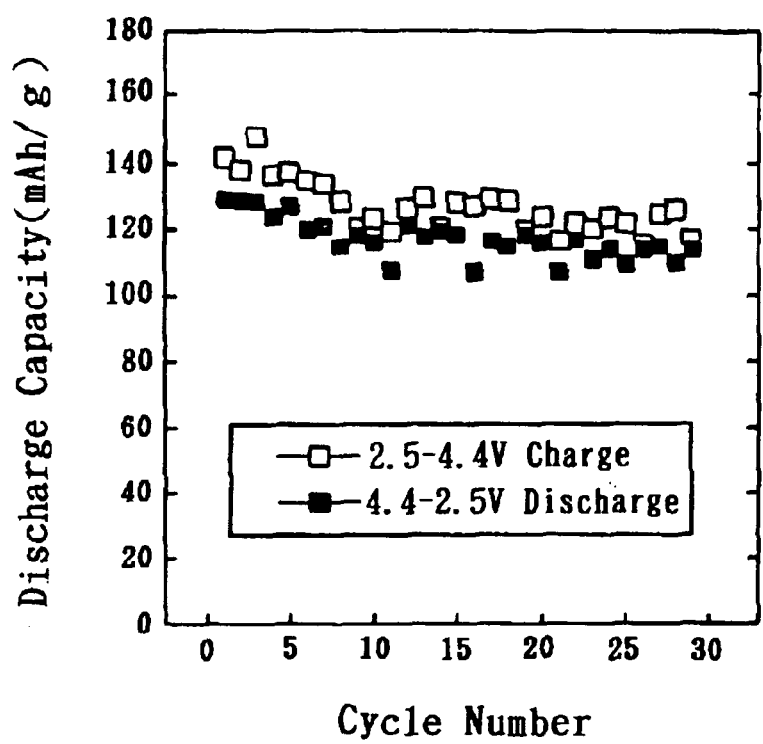
FIG. 16 is a graph for illustrating the charge-discharge cyclic characteristics of the positive electrode capacity, charge-discharge cyclic characteristics which were exhibited by a polymer lithium battery, including a lithium salt (e.g., $Li(CF_3SO_2)_2N$) with LiPF6 added, when it was charged and discharged with an electric current density of 0.02 mA/cm$^2$ at 40° C.

The same battery was charged and discharged with an electric current density I=0.02 mA/cm$^2$ at 40° C. FIG. 16 illustrates the resulting cyclic characteristic of the positive electrode capacity. Note that the interface resistance between the polymer electrolyte and Li negative electrode was so large at 40° C. that it was difficult to charge and discharge the battery with high electric current densities at the temperature. However, as illustrated in FIG. 16, the battery could be charged and discharged stably with an electric current density I=0.02 mA/cm$^2$ at 40° C.

Table 5 below summarizes the bulk resistances of the polymer electrolytes, the interface resistances of the polymer electrolytes and LiNi$_{0.8}$Co$_{0.2}$O$_2$ positive electrode and the interface resistances of the polymer electrolytes and Li negative electrode at low temperatures. Note that the interface resistances were measured values after contacting the $LiNi_{0.8}Co_{0.2}O_2$ positive electrode and Li negative electrodes with the polymer electrolytes for a few hours. As can be seen from Table 5, the interface resistances between the Li negative electrode and the polymer electrolytes free from the hyperbranched polymer were low, but the bulk resistances of the polymer electrolytes free from the hyperbranched polymer were high. On the whole, it is understood that the total resistance of the bulk of the polymer electrolyte as well as the interface resistance between the electrodes and polymer electrolyte can be reduced when the hyperbranched polymer is added.

TABLE 5

| Hyperbranched Polymer Content in Polymer Composite (% by weight) | Lithium Salt | Temp. (° C.) | Ionic Conductivity σ (S/cm²) | Bulk Resistance of Polymer Electrolyte (Ω cm²) | Interface Resistance between Positive Electrode and Polymer Electrolyte (Ω cm²) | Interface Resistance between Li Negative Electrode and Polymer Electrolyte (Ω cm²) |
| --- | --- | --- | --- | --- | --- | --- |
| 0 | Li-imide | 25 | $7.9 \times 10^{-6}$ | 10,000 | Not Measured | Not Measured |
|  |  | 40 | Not Measured | 1,200 | Not Measured | 2,000 |
|  | 90% by weight Li-imide-10% by weight $LiPF_6$ | 25 | $1.2 \times 10^{-5}$ | 8,000 | 3,000 | 8,000 |
|  |  | 40 | Not Measured | 1,200 | 1,800 | Not |
| 10 | 90% by weight Li-imide-10% by weight $LiPF_6$ | 30 | $1.5 \times 10^{-4}$ | Not Measured | Not Measured | 11,500 |
|  |  | 40 | $6.0 \times 10^{-4}$ | 87 | Not Measured | 3,300 |
|  |  | 50 | $1.0 \times 10^{-3}$ | 55 | Not Measured | 1,180 |

Note:
The hyperbranched polymer was poly-Aclb.
"Li-imide" stands for Li $(CF_3SO_2)_2N$.
The positive electrode was an $LiNi_{0.8}Co_{0.2}O_2$-acetylene black electrode.
The thickness of the polymer electrolyte films was about 200 μm.

Long Term Cyclic Characteristic

Figure 17:
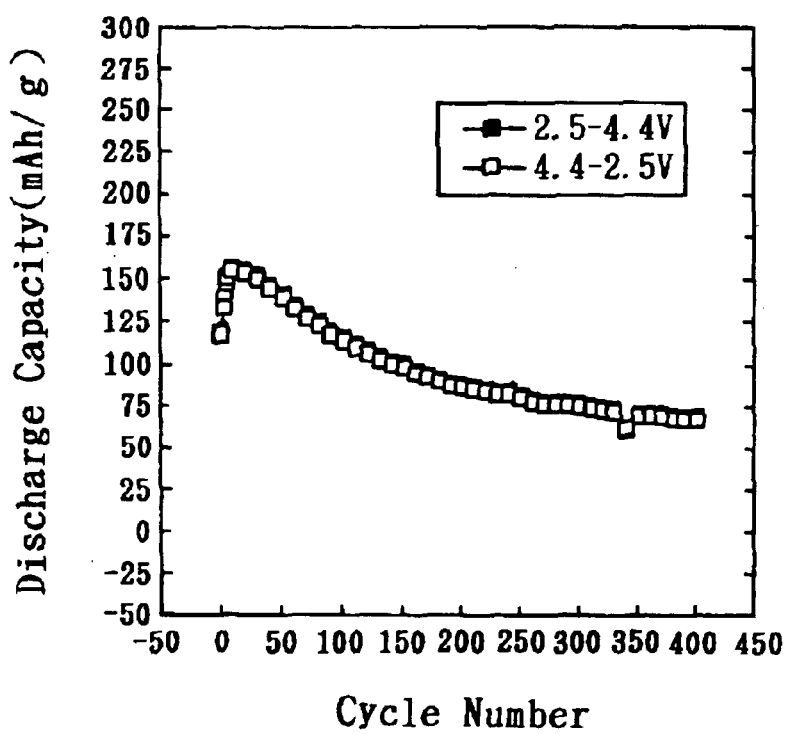
FIG. 17 is a graph for illustrating the charge-discharge cyclic characteristics of the positive electrode capacity, charge-discharge cyclic characteristics which were exhibited by a polymer lithium battery, including a lithium salt (e.g., $Li(CF_3SO_2)_2N$) with $LiPF_6$ added, when it was charged and discharged with an electric current density of 0.2 mA/cm$^2$ at 60 ° C.

Except the content of the positive electrode active material (i.e., $LiNi_{0.8}Co_{0.2}O_2$) was reduced, a battery was made in the same manner as the above-described battery. The resulting battery was investigated for the long term cyclic characteristic. Specifically, the battery was charged and discharged with an electric current density I=0.2 mA/cm² at 60° C. FIG. 17 illustrates the variation of the battery capacity with the number of charge-discharge cycles. It was found that the capacity tended to enlarge in an initial few dozens of charge-discharge cycles. When the battery resistance was measured before and after the battery was charged and discharged, it was found that the battery resistance lowered in the initial charge-discharge cycles. It is believed that the lowered battery resistance affected the battery capacity enlargement. It seems that the lowered battery resistance resulted from the fact that the contact resistances between the contacts of the battery were reduced when the battery was charged and discharged.

Mechanical Characteristic of Polymer Electrolyte Film

Generally speaking, in polymer electrolyte films, the ionic conductivity and the mechanical strength are in a trade-off relationship. The tensile strengths of polymer electrolyte films according to the present invention and other polymer electrolyte films were measured at a plurality of temperatures with a tensile strength tester which was made at the present inventors' laboratory. Table 6 below recites some of the measurement results.

TABLE 6

| Composition of Polymer Electrolyte Film | Temp. (° C.) | Load at 100% Elongation (MPa) | Load at Fracture (MPa) |
| --- | --- | --- | --- |
| {(PEO-10% by weight poly-Aclb)$_{10}$-(Li-imide-10% by weight $LiPF_6$)}-10% by weight $BaTiO_3$ | 30 | 2.7 | 3.6 |
|  | 40 | 1.7 | Not Measured |
|  | 50 | 1.4 | Not Measured |
|  | 60 | 0.56 | 1.3 |
|  | 70 | 0.33 | Not Measured |
| {(PEO-10% by weight poly-Aclb)$_{25}$-(Li-imide-10% by weight $LiPF_6$)}-10% by weight $BaTiO_3$ | 30 | 3.4 | Not Measured |
|  | 60 | 0.60 | 1.60 |
| PEO | 30 | 14 | Not Measured |
| PEO-10% by weight $BaTiO_3$ | 30 | 17 | Not Measured |
|  | 60 | 10 | Not Measured |
| Polymer Electrolyte Film made by DAISO Co., Ltd. | Room Temp. | 3.0 | 4.5 |

Note:
Li-imide stands for Li $(CF_3SO_2)_2N$.
The subscript values following the polymer composite are the weight ratios of the polymer composite with respect to the weight of the composite lithium salt taken as 1.
In the first polymer electrolyte film, the molar ration polymer composite with respect to the composite lithium salt was 91:9.
In the second polymer electrolyte film, the molar ratio of the polymer composite with respect to the composite lithium salt was 2275:90.

As set forth in Table 6, it seems that the mechanical strength of PEO is lowered when the lithium salt is added. However, note that the polymer electrolyte films according to the present invention exhibited mechanical strengths substantially equivalent to those exhibited by the cross-linked polymer electrolyte film which were made by DAISO Co., Ltd. The company reported the cross-linked polymer electrolyte film with a poster at the 10th International Meeting on Lithium Batteries "Lithium 2000" which was held in Como, Italy on May 28th through Jun. 2nd, 2000.

Effect of $LiPF_6$ Addition on Aluminum Corrosion Voltage

The polymer lithium battery according to the present invention produces a voltage of 4 V or more. However, as set forth in Table 7 below, aluminum making current collectors started corroding at 3.8 V when $Li(CF_3SO_2)_2N$ was used independently as the lithium salt. Meanwhile, the corrosion voltage was improved slightly to 4.1 V when $Li(C_2F_5SO_2)_2N$ was used as the lithium salt. Note that the aluminum corrosion voltage increased when $LiPF_6$ was added to $Li(CF_3SO_2)_2N$ and $Li(C_2F_5SO_2)_2N$ in an amount of 10% by weight. Moreover, when $Li(CF_3SO_2)_2N$ was used independently as the lithium salt, the voltage at which aluminum started corroding did not vary even if the PEO-PPO copolymer substituted for PEO, the substrate polymer. From these facts, it is understood that it is effective to add $LiPF_6$ in order to enhance the aluminum corrosion voltage.

TABLE 7

| Composition of Polymer Electrolyte | | Contact Resistance (Ω) | | Al Corrosion Voltage (V) | Interface Resistance between Li and Polymer Electrolyte (Ω cm$^2$) |
|---|---|---|---|---|---|
| Polymer | Lithium Salt | Al with 99.99% Pt Purity | Al Alloy Foil | | |
| PEO | Li-imide | 2 | 100 | 160 | 3.8 | 30 (after 10 days) |
| | Li-Beti | 2 | 40 | 110 | 4.1 | 65 (after 17 days) |
| | 90% by weight Li-imide-10% by weight LiPF$_6$ | Not Applicable | 33 | 75 | 4.5 | 55 (after 17 days) |
| | 90% by weight Li-Beti-10% by weight LiPF$_6$ | Not Applicable | 35 | 78 | 4.4 | 70 (after 11 days) |
| | 90% by weight Li-imide-10% by weight LiBF$_4$ | Not Applicable | Not Applicable | 100 | 4.3 | 220 (after 6 days) |
| | 90% by weight Li-imide-10% by weight LiClF$_4$ | Not Applicable | Not Applicable | 188 | 3.8 | 78 (after 10 days) |
| PEO-PPO | Li-imide | Not Applicable | Not Applicable | 145 | 3.9 | 35 (after 10 days) |

Note:
"Li-imide" stands for Li (CF$_3$SO$_2$)$_2$N.
"Li-Beti" stands for Li (C$_2$F$_5$SO$_2$)$_2$N.

Figure 18:
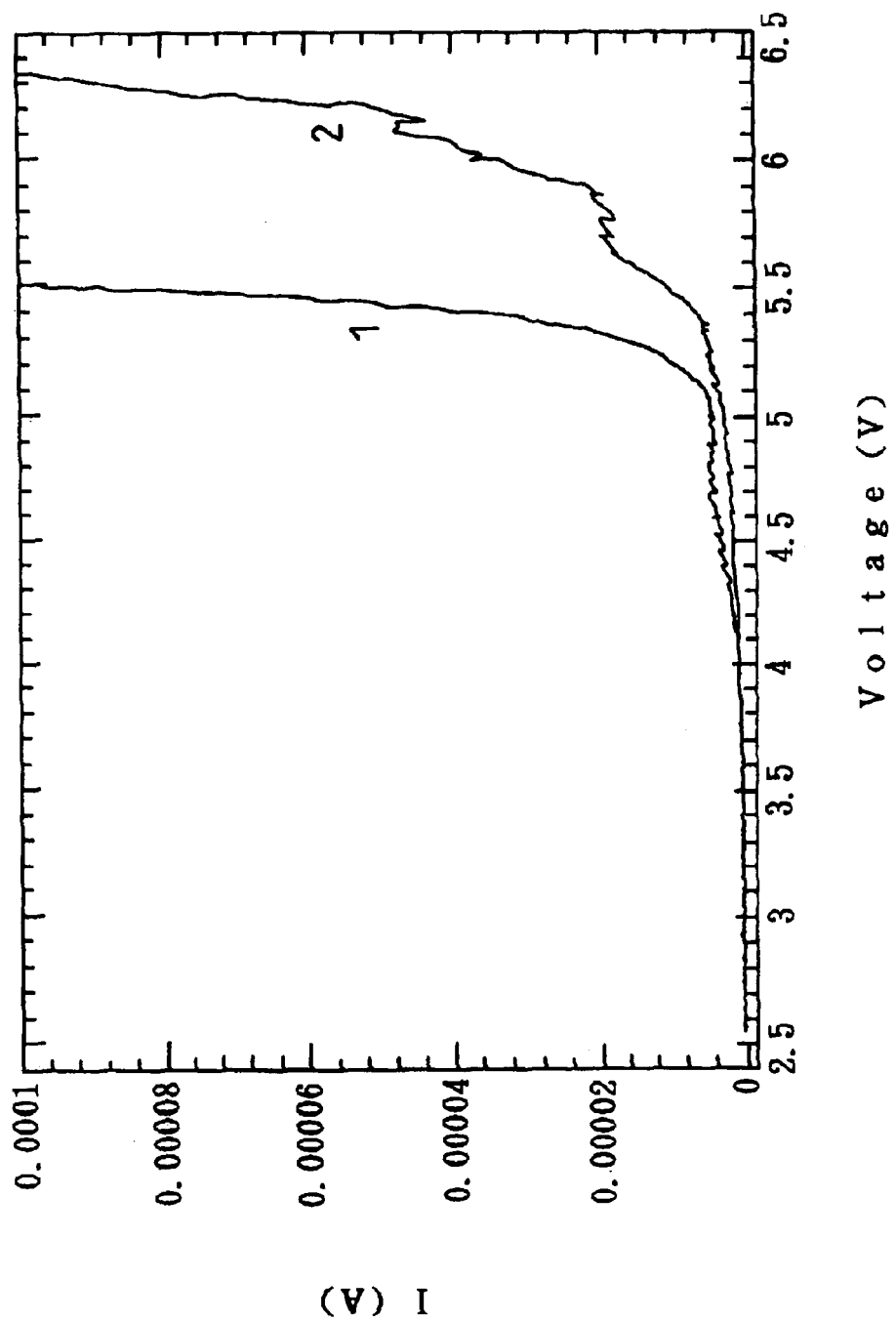
FIG. 18 is a graph for illustrating the cyclic voltammetry curves which were exhibited by Li/polymer electrolyte/Al cells, including a lithium salt (e.g., $Li(CF_3SO_2)_2N$) with $LiPF_6$ added, at 80° C.

FIG. 18 illustrates characteristics regarding the electrochemical stability of polymer lithium batteries. The polymer lithium battery was disposed in a stainless steel container, and comprised a composite lithium salt which included Li(CF$_3$SO$_2$)$_2$N with LiPF$_6$ added. In the drawing, the curve marked with "1" designates a polymer lithium battery whose lithium salt included Li(CF$_3$SO$_2$)$_2$N only, and the curve marked "2" designates the polymer lithium battery which comprised the composite lithium salt.

As illustrated in FIG. 18, the polymer lithium battery which comprised the composite salt including Li(CF$_3$SO$_2$)$_2$N with LiPF$_6$ added was stable up to such a high voltage as 6 V. Thus, it is appreciated that the polymer lithium battery was good in terms of the electrochemical stability (i.e., the potential window).

EXAMPLE NO. 10

A polymer lithium battery was made, and comprised a negative electrode, an electrolyte, and a positive electrode. Metallic lithium was used as a negative electrode. The following polymer electrolyte was used as the electrolyte. The polymer electrolyte comprised a 90% by weight polymer composite with a composite lithium salt, and 10% by weight BaTiO$_3$. The polymer composite comprised 90% by weight PEO, and 10% by weight poly-Aclb. The PEO had a molecular weight of 60×10$^4$. The poly-Aclb had a molecular weight of 25×10$^4$. The composite lithium salt comprised 90% by weight Li(CF$_3$SO$_2$)$_2$N and 10% by weight LiPF$_6$. The polymer electrolyte comprised the lithium atoms in such a ratio that the number of the lithium atoms with respect to the number of the oxygen atoms included in the ether bonds of the PEO and poly-Aclb of the polymer composite was 1/10. The positive electrode was made by adding trialkoxy boroxine in an amount of from 0 to 100 parts by weight with respect to 100 parts by weight of a positive electrode composition. Note that the positive electrode composition comprised LiNi$_{0.8}$Co$_{0.2}$O$_2$ in an amount of 65% by weight, a binder in an amount of 25% by weight, and acetylene black in an amount of 15% by weight. Note that the binder had the same composition as that of the polymer electrolyte used herein as the electrolyte. The trialkoxy boroxine Bx(n) used herein was Bx(7.2) in which the polymerization degree of the ethylene oxide chains was n=7.2 (i.e., a mixture of trialkoxy boroxines in which the polymerization degree of the ethylene oxide chains was n=8, 7, and so on).

Figure 19:
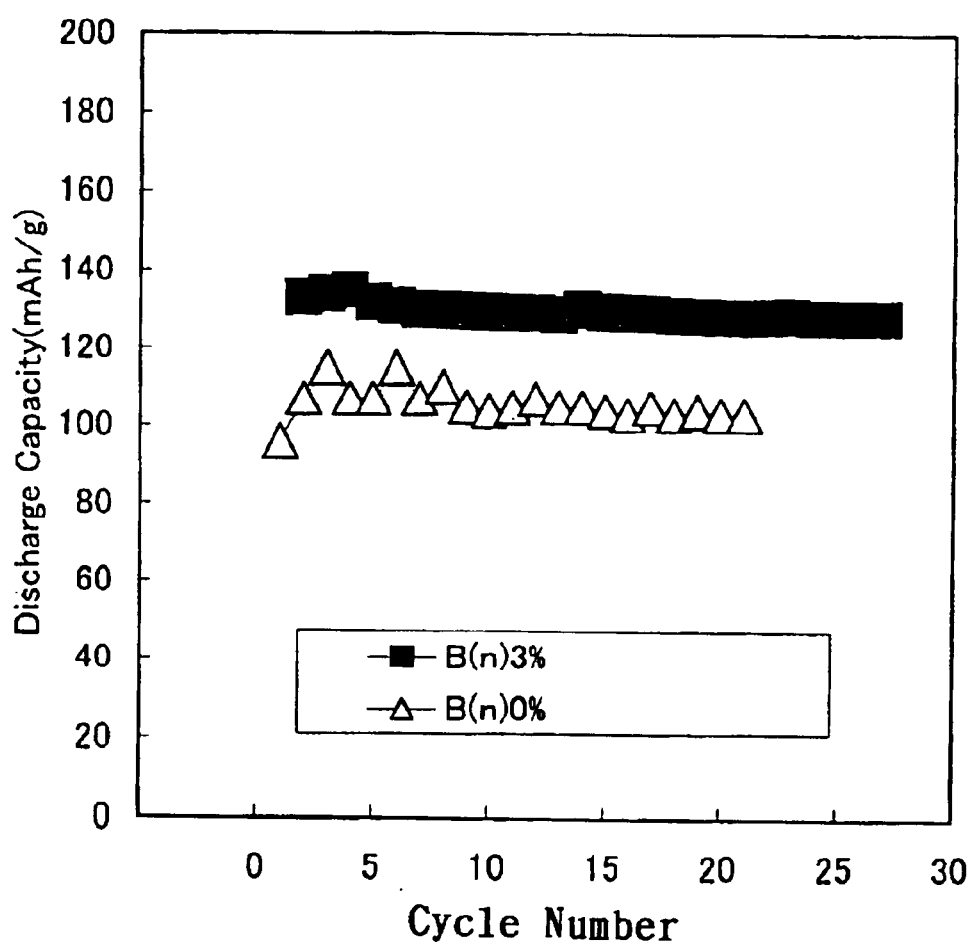
FIG. 19 is a graph for illustrating the cyclic characteristics of the positive electrode capacity, cyclic characteristics which were exhibited by a polymer lithium battery, including a polymer electrolyte with a boroxine compound added as the binder of the positive electrode, when it was charged and discharged with an electric current density of 0.1 mA/cm$^2$ at 50° C.

Test on Cyclic Characteristic of Polymer Lithium Battery Comprising Positive Electrode with Boroxine Compound Added The resultant polymer lithium batteries were charged and discharged with an electric current density I=0.1 mA/cm$^2$ at 50° C., and was thereby assessed for the variation of the positive electrode capacity with the charge-discharge cycles. FIG. 19 illustrates how the positive electrode capacity varied with the charge-discharge cycles. In the polymer lithium battery whose positive electrode was free from the Bx(7.2) addition, the initial positive electrode capacity was 113 mAh/g, and lowered gradually with the charge-discharge cycles so that it declined to 102 mAh/g after 20 cycles passed. Thus, in the polymer lithium battery whose positive electrode was free from the Bx(7.2) addition, the reduction rate of the positive electrode capacity per one charge-discharge cycle was 0.48%. The reduction rate per one cycle was calculated by the following equation:

Reduction Rate per One Cycle (%)=[{Initial Capacity)−(Capacity After 20 Cycles)}/(Initial Capacity)]×(100/20)

On the other hand, in the polymer lithium battery comprising the positive electrode in which the Bx(7.2) was added in an amount of 3 parts by weight with respect to 100 parts by weight of the positive electrode composition, the initial positive electrode capacity was 135 mAh/g. The initial capacity enlarged by a factor of 20% approximately, compared with the initial capacity exhibited by the polymer lithium battery whose positive electrode was free from the Bx(7.2) addition. Moreover, in the polymer lithium battery comprising the positive electrode with the Bx(7.2) added, the capacity lowered only to 129 mAh/g even after 25 cycles passed. Thus, the reduction rate of the positive electrode capacity per one charge-discharge cycle was 0.18%. Hence, the reduction rate of the positive electrode capacity per one charge-discharge cycle was less than halved, compared with the reduction rate exhibited by the polymer lithium battery whose positive electrode was free from the Bx(7.2) addition.

Moreover, regarding the polymer lithium battery of Example No. 10 comprising the positive electrode in which the Bx(7.2) was added in an amount of 10 parts by weight with respect to 100 parts by weight of the positive electrode composition, the variation of the positive electrode capacity with the charge-discharge cycles was assessed separately by charging and discharging the polymer lithium battery with an electric current density I=0.02 mA/cm$^2$ at 35° C., and was thereby examined whether it could operate at the low temperature. As a result, the initial positive electrode capacity was 128 mAh/g, and was kept as it was even after 10 charge-discharge cycles passed. The initial positive electrode capacity was much higher than the initial positive electrode capacity exhibited by the polymer lithium battery whose positive electrode was free from the Bx(7.2) addition. Note that the polymer lithium battery whose positive electrode was free from the Bx(7.2) addition showed 0 V battery voltage within a few minutes after it was discharged.

In addition, polymer lithium batteries were made in which polymer electrolytes with the Bx(7.2) added were used as the electrolyte, and were examined for the cyclic characteristic. However, they did not show any improvement on the cyclic characteristic.

It has not been clarified at present why the positive electrode capacity of the polymer lithium batteries is enlarged and the cyclic characteristic is improved when the polymer electrolytes including the Bx(7.2) are added to the positive electrode as the binder. However, it is believed possible to relate the advantage to lowered interface resistance hereinafter described.

Test on Interface Resistance Between Electrolyte and Positive Electrode

In order to examine the interface resistance between the polymer electrolyte and positive electrode in the respective polymer lithium batteries made in Example No. 10, the following test was carried out. Test samples or cells were prepared in the following manner. Positive electrodes used herein were the same positive electrodes used in Example No. 10 in which the Bx(7.2) was added to the positive electrode composition in the same amounts as described above. An electrolyte used herein was the same as the polymer electrolyte used in Example No. 10. The electrolyte was disposed between a pair of identical positive electrodes to make test cells. The resulting test cells were subjected to an interface resistance measurement. Specifically, the test cells were left at a temperature of 50° C. and 40° C., respectively, for 10 days. Thereafter, the interface resistance of the test cells was determined selectively by measuring the frequency dependency of the impedance exhibited by the test cells. Table 8 below summarizes the measurement results of the thus obtained interface resistances.

TABLE 8

| Bx (7.2) Addition (parts by weight) | Interface Resistance at 50° C. ($\Omega$ cm$^2$) | Interface Resistance at 40° C. ($\Omega$ cm$^2$) |
| --- | --- | --- |
| 0 | 200 | 325 |
| 3 | 163 | 225 |
| 5 | 131 | Not Measured |
| 10 | 182 | Not Measured |

It is apparent from Table 8 that the test cells which comprised the positive electrodes with the Bx(7.2) added exhibited the lowered interface resistance with resect to the interface resistance exhibited by the test cell which comprised the positive electrode free from the Bx(7.2) addition. Further, the test cell which comprised the positive electrodes with the 3 parts by weight Bx(7.2) addition showed the remarkably lowered interface resistance at such a low temperature as 40° C., compared with the interface resistance shown by the test cell which comprised the positive electrode free from the Bx(7.2) addition. Thus, it is believed that the enlarged positive electrode capacity as well as the improved charge-discharge cyclic characteristic described above result from the lowered interface resistance between the polymer electrolyte and positive electrode. Furthermore, it seems that the optimum Bx(7.2) addition falls in a range of from 3 to 10 parts by weight with respect to 100 parts by weight of the positive electrode composition (or from 2.9 to 9.1% by weight with respect to the entire polymer electrode taken as 100% by weight). Moreover, since the advantage resulting from the Bx(7.2) addition is effected remarkably at low temperatures, it is understood that it is possible to operate polymer lithium batteries, comprising positive electrodes in which polymer electrolytes with Bx(n) added are used as the binder, at low temperature.

Having now fully described the present invention, it will be apparent to one of ordinary skill in the art that many changes and modifications can be made thereto without departing from the spirit or scope of the present invention as set forth herein including the appended claims.

What is claimed is:

1. A polymer lithium battery, comprising:
    a positive electrode;
    a polymer electrolyte and
    a negative electrode
    wherein the polymer electrolyte comprises a copolymer and a composite lithium salt, wherein the copolymer is comprises:
        a substrate polymer and
        a branched polymer having a main chain whose repeating unit is composed of an oligoethylene oxide chain and a connector molecule bonded to the oligoethylene oxide chain
    the connector molecule being bonded to an end group of the main oligoethylene oxide chain by an ether bond, bonded to an end group of a branched oligoethylene oxide chain by an ether bond, and bonded to an end group of the main oligoethylene oxide chain or the branched oligoethylene oxide side chain of a neighboring repeating unit by an ester bond to form the repeating unit of the oligoethylene oxide chain
    wherein said lithium salt is at least one member selected from the group consisting of Li(CF$_3$SO$_2$)$_2$N—LiPF$_6$ composite salts and Li(C$_2$F$_5$SO$_2$)$_2$N—LiPF$_6$ composite salts.

2. The polymer lithium battery set forth in claim 1, wherein said polymer electrolyte further comprises a composite oxide.

3. The polymer lithium battery set forth in claim 1, wherein said composite lithium salt includes LiPF$_6$ in an amount of from 5 to 20% by weight with respect to the entire composite lithium salt taken as 100% by weight.

4. The polymer lithium battery set forth in claim 1, wherein said polymer electrolyte further comprises a boroxine compound, and said positive electrode comprises a binder, the binder comprising:
    a substrate polymer;
    a branched polymer having a main chain whose repeating unit is composed of an oligoethylene oxide chain and a connector molecule bonded to the oligoethylene oxide chain;
    a lithium salt; and
    a boroxine compound.

5. A polymer lithium battery, comprising:
    a positive electrode;
    a negative electrode; and
    a polymer electrolyte, comprising:
        a copolymer composed of a substrate polymer and a branched polymer, the branched polymer comprising repeating units composed of a hub molecule and an oligoethylene oxide chain bonded to the hub molecule and branched by way of the hub molecule in two directions at least; and a composite lithium salt;

the hub molecule being bonded to an end group of the main oligoethylene oxide chain by an ether bond, bonded to an end group of a branched oligoethylene oxide chain by an ether bond, and bonded to an end group of the main oligoethylene oxide chain or the branched oligoethylene oxide side chain of a neighboring repeating unit by an ester bond to form the repeating unit of the oligoethylene oxide chain, wherein said composite lithium salt is at least one member selected from the group consisting of $Li(CF_3SO_2)_2N$—$LiPF_6$ composite salts and $Li(C_2F_5SO_2)_2N$—$LiPF_6$ composite salts.

6. The polymer lithium battery set forth in claim 1, wherein said connector molecule is aromatic carboxylic acids having a plurality of hydroxy groups, and esters thereof.

7. The polymer lithium battery set forth in claim 1, wherein said connector molecule is dihydroxy aromatic carboxylate.

8. The polymer lithium battery set forth in claim 1, wherein said connector molecule is 3,5-dihydroxy benzoic acid.

9. The polymer lithium battery set forth in claim 1, wherein said branched polymer is polybistriethylene glycol benzoate.

10. The polymer lithium battery set forth in claim 5, wherein said connector molecule is aromatic carboxylic acids having a plurality of hydroxy groups, and esters thereof.

11. The polymer lithium battery set forth in claim 5, wherein said connector molecule is dihydroxy aromatic carboxylate.

12. The polymer lithium battery set forth in claim 5, wherein said connector molecule is 3,5-dihydroxy benzoic acid.

13. The polymer lithium battery set forth in claim 5, wherein said branched polymer is polybistriethylene glycol benzoate.

* * * * *

UNITED STATES PATENT AND TRADEMARK OFFICE
CERTIFICATE OF CORRECTION

PATENT NO. : 6,924,067 B1
DATED : August 2, 2005
INVENTOR(S) : Takahito Ito et al.

It is certified that error appears in the above-identified patent and that said Letters Patent is hereby corrected as shown below:

Column 30,
Line 20, delete "is" after "copolymer".

Signed and Sealed this

Twenty-ninth Day of November, 2005

JON W. DUDAS
*Director of the United States Patent and Trademark Office*